United States Patent
Tyrrell, III et al.

(10) Patent No.: US 7,783,695 B1
(45) Date of Patent: Aug. 24, 2010

(54) METHOD AND SYSTEM FOR DISTRIBUTED RENDERING

(75) Inventors: D'Arcy M. Tyrrell, III, Orange, CA (US); Anne P. Wagner, San Francisco, CA (US); David Witters, Marina Del Rey, CA (US); Richard A. Petersen, Hudson, WI (US); David Lease, Eagan, MN (US)

(73) Assignee: Graphics Properties Holdings, Inc., Palo Alto, CA (US)

( * ) Notice: Subject to any disclaimer, the term of this patent is extended or adjusted under 35 U.S.C. 154(b) by 720 days.

(21) Appl. No.: 09/609,046

(22) Filed: Jun. 30, 2000
(Under 37 CFR 1.47)

Related U.S. Application Data

(60) Provisional application No. 60/198,313, filed on Apr. 19, 2000, provisional application No. 60/198,314, filed on Apr. 19, 2000.

(51) Int. Cl.
*G06F 15/16* (2006.01)
*G06T 13/00* (2006.01)

(52) U.S. Cl. .............. 709/201; 709/203; 709/219; 345/473

(58) Field of Classification Search ......... 709/201–203, 709/219; 345/505, 473–5; 715/744, 740
See application file for complete search history.

(56) References Cited

U.S. PATENT DOCUMENTS

| | | | |
|---|---|---|---|
| 5,018,060 A | 5/1991 | Gelb et al. | |
| 5,025,369 A | 6/1991 | Schwartz | |
| 5,179,637 A * | 1/1993 | Nardozzi | 358/1.15 |
| 5,335,013 A | 8/1994 | Faber | |
| 5,459,837 A * | 10/1995 | Caccavale | 709/226 |
| 5,475,819 A * | 12/1995 | Miller et al. | 709/203 |
| 5,528,375 A | 6/1996 | Wegeng et al. | |
| 5,606,689 A | 2/1997 | Nakagawa | |
| 5,644,720 A | 7/1997 | Boll et al. | 395/200.12 |
| 5,668,986 A | 9/1997 | Nilsen et al. | 395/610 |
| 5,671,408 A | 9/1997 | McBride | |
| 5,721,883 A * | 2/1998 | Katsuo et al. | 345/505 |
| 5,737,549 A * | 4/1998 | Hersch et al. | 709/203 |
| 5,757,385 A * | 5/1998 | Narayanaswami et al. | 345/505 |
| 5,761,396 A * | 6/1998 | Austin et al. | 709/201 |
| 5,761,507 A * | 6/1998 | Govett | 709/101 |
| 5,778,393 A | 7/1998 | Blea et al. | |
| 5,815,156 A * | 9/1998 | Takeuchi | 345/419 |

(Continued)

OTHER PUBLICATIONS

Dan Ochiva, Kristinha McCort, and Michael Goldman. "Impressions of Siggraph: Standouts from the Show Floor" Oct. 1, 1999 http://millimeter.com/mag/video_impressions_siggraph_standouts/.*

(Continued)

*Primary Examiner*—Aaron Strange
(74) *Attorney, Agent, or Firm*—Baker Botts L.L.P.

(57) ABSTRACT

A computerized method for rendering images includes receiving from a client a render job having an associated job profile, distributing the render job via a communications medium to at least one of a plurality of render servers based at least in part on the job profile, and rendering the render job. The method also includes forwarding the rendered render job to a network storage system for retrieval by the client.

29 Claims, 10 Drawing Sheets

U.S. PATENT DOCUMENTS

| | | | | |
|---|---|---|---|---|
| 5,872,523 | A | | 2/1999 | Dellaverson et al. ... 340/825.52 |
| 5,873,121 | A | * | 2/1999 | Merchant et al. ............ 711/173 |
| 5,881,315 | A | | 3/1999 | Cohen ........................ 395/872 |
| 5,893,098 | A | | 4/1999 | Peters et al. |
| 5,894,554 | A | | 4/1999 | Lowery et al. ......... 395/200.33 |
| 5,899,998 | A | | 5/1999 | McGauley et al. |
| 5,903,889 | A | | 5/1999 | de la Huerga et al. |
| 5,944,779 | A | | 8/1999 | Blum |
| 5,977,965 | A | * | 11/1999 | Davis et al. ................ 715/723 |
| 6,006,231 | A | * | 12/1999 | Popa .......................... 707/101 |
| 6,029,001 | A | * | 2/2000 | Katsuo et al. ............... 717/154 |
| 6,044,372 | A | | 3/2000 | Rothfus et al. ................ 707/10 |
| 6,044,442 | A | | 3/2000 | Jesionowski |
| 6,055,562 | A | * | 4/2000 | Devarakonda et al. ...... 709/201 |
| 6,058,394 | A | | 5/2000 | Bakow et al. |
| 6,067,559 | A | * | 5/2000 | Allard et al. ................ 709/202 |
| 6,076,105 | A | | 6/2000 | Wolff et al. |
| 6,085,220 | A | | 7/2000 | Courts et al. ................ 709/201 |
| 6,101,528 | A | | 8/2000 | Butt |
| 6,112,225 | A | | 8/2000 | Kraft et al. |
| 6,148,330 | A | | 11/2000 | Puri et al. .................... 709/217 |
| 6,154,787 | A | | 11/2000 | Urevig et al. |
| 6,167,442 | A | * | 12/2000 | Sutherland et al. .......... 709/217 |
| 6,167,563 | A | | 12/2000 | Fontana et al. ................. 717/1 |
| 6,182,075 | B1 | | 1/2001 | Hsu |
| 6,185,466 | B1 | | 2/2001 | Nicewonger ................. 700/19 |
| 6,191,800 | B1 | * | 2/2001 | Arenburg et al. ............ 345/505 |
| 6,192,388 | B1 | * | 2/2001 | Cajolet ....................... 709/201 |
| 6,192,393 | B1 | * | 2/2001 | Tarantino et al. ............ 709/203 |
| 6,192,407 | B1 | * | 2/2001 | Smith et al. ................. 709/229 |
| 6,215,559 | B1 | * | 4/2001 | Bryniarski et al. ......... 358/1.15 |
| 6,229,205 | B1 | | 5/2001 | Jeong et al. ................. 257/676 |
| 6,243,385 | B1 | | 6/2001 | Chen et al. |
| 6,286,043 | B1 | * | 9/2001 | Cuomo et al. ............... 709/223 |
| 6,292,800 | B1 | | 9/2001 | Eldreth ........................ 707/10 |
| 6,324,552 | B1 | | 11/2001 | Chang et al. |
| 6,338,147 | B1 | * | 1/2002 | Meth et al. ..................... 714/13 |
| 6,393,458 | B1 | | 5/2002 | Gigliotti et al. ............. 709/203 |
| 6,438,553 | B1 | * | 8/2002 | Yamada ...................... 709/201 |
| 6,438,576 | B1 | * | 8/2002 | Huang et al. ................ 709/202 |
| 6,453,339 | B1 | | 9/2002 | Schultz et al. .............. 709/206 |
| 6,460,037 | B1 | | 10/2002 | Weiss et al. |
| 6,487,599 | B1 | * | 11/2002 | Smith et al. ................. 709/203 |
| 6,496,823 | B2 | * | 12/2002 | Blank et al. ................. 709/201 |
| 6,501,476 | B1 | * | 12/2002 | Gould et al. ................ 345/473 |
| 6,522,336 | B1 | * | 2/2003 | Yuasa ......................... 345/582 |
| 6,525,731 | B1 | * | 2/2003 | Suits et al. ................... 345/427 |
| 6,532,016 | B1 | * | 3/2003 | Venkateswar et al. ....... 345/505 |
| 6,539,445 | B1 | * | 3/2003 | Krum .......................... 710/110 |
| 6,598,090 | B2 | | 7/2003 | Champlin |
| RE38,410 | E | * | 1/2004 | Hersch et al. ................ 709/203 |
| 6,789,143 | B2 | * | 9/2004 | Craddock et al. ............. 710/54 |
| 6,798,417 | B1 | * | 9/2004 | Taylor ......................... 345/502 |
| 6,854,034 | B1 | | 2/2005 | Kitamura et al. |
| 2002/0109861 | A1 | * | 8/2002 | LeClair et al. .............. 709/224 |

OTHER PUBLICATIONS

"Alias|Wavefront and WAM!NET Partner to Deliver High-Speed Rendering to the Animation and 3D Special Effects Industries" Wave Issue 9079, Aug. 10, 1999, article 4-02. http://www.wave-report.com/archives/1999/90790402.htm.*

Paul Bourke, "Parallel Rendering: Using PORVAY on a Computer Farm", Aug. 1999, Web Page, Available at: http://local.wasp.uwa.edu.au/~pbourke/rendering/parallel/.*

D.J. Hancock and R.J. Hubbold, "Distributed Parallel Volume Rendering on Shared Memory Systems", 1997, in High Performance Computers and Networks—Europe 1997.*

Unknown, ROD Fact Sheet, WAM/NET Entertainment Services, http://www.wamnet.com/services/entertainment/rodfactsheet.phtml, 2 pages, Apr. 18, 2000.

Unknown, ROD Render on Demand Service, WAM/NET Entertainment Services, http://www.wamnet.com/services/entertainment/rod.phtml, 2 pages, Apr. 18, 2000.

Unknown, Wide Area Rendering Service Extends Your Farm into a Fully-Loaded Scene-to-Image Rendering Facility without Added Costs, WAM/NET Entertainment Services, http://www.wamnet.com/services/entertainment/whitepaper_rod.phtml, Presented at NAB Conference, Apr. 19-23, 1999, 3 pages.

U.S. Appl. No. 09/609,045, entitled "Management and Scheduling of a Distributed Rendering Method and System," filed Jun. 30, 2000, 69 total pages (.0187).

U.S. Appl. No. 09/608,938, entitled "Method and System for Secure Remote Distributed Rendering," filed Jun. 30, 2000, 66 total pages (.0188).

Load Sharing Facility available from Platform Computing; see www.platform.com, Unknown.

* cited by examiner

METHOD AND SYSTEM FOR DISTRIBUTED RENDERING

RELATED APPLICATIONS

This application claims the benefit of U.S. Provisional Application Ser. No. 60/198,313, filed Apr. 19, 2000 and U.S. Provisional Application Ser. No. 60/198,314, filed Apr. 19, 2000. This application is related to a U.S. nonprovisional patent application having a Ser. No. 09/609,045, a title of Management and Scheduling of a Distributed Rendering Method and System, and filed Jun. 30, 2000. This application is also related to a U.S. nonprovisional patent application having a Ser. No. 09/608,938, a title of Method and System for Secure Remote Distributed Rendering, and filed Jun. 30, 2000.

TECHNICAL FIELD OF THE INVENTION

This invention relates generally to distributed computing and more particularly to a method and system for distributed rendering.

BACKGROUND OF THE INVENTION

Computer graphics and animation permeates today's society. Motion pictures such as Jurassic Park and Toy Story make extensive use of computer graphics and animation. In general, animation is produced by creating a description, usually stored in a computer file, of an object to be displayed, such as the skeleton of a dinosaur. In addition, associated information affecting how the object will appear is stored. This information may include source and direction of light sources, texture of the object, and movement the object may take. Thus, for example, the dinosaur may be displayed moving from left to right at sunset in a rapid fashion, and he may or may not have grey skin having a rough texture. Once all of this information describing how the object will appear in the motion picture is compiled, the actual images displayed in the motion picture are generated. Generating an image from a description of the object and associated information is referred to as rendering. The rendering process may generate a series of files that are stored and then displayed in a motion picture.

Rendering may involve complex mathematics, which is often addressed utilizing significant computing power. In addition, software packages designed for rendering have associated license fees. Thus, there is a fixed cost associated with maintaining computers and software used for rendering. In addition, such computers often sit idle when not performing their rendering functions, resulting in inefficient use of these computing resources. Such rendering machines are often difficult to maintain and production facilities often spend too much time and money keeping their machines operational and have great difficulty expanding their capacity, including obtaining financing and designing the appropriate software architecture.

SUMMARY OF THE INVENTION

Accordingly, a need has arisen for an improved method and system for distributed computing and, more particularly, a method and system for distributed rendering. The present invention provides an apparatus and method for distributed rendering that addresses shortcomings of prior systems and methods.

According to one embodiment of the invention, a computerized method for rendering images includes receiving from a client a render job having an associated job profile, distributing the render job via a communications medium to at least one of a plurality of render servers based at least in part on the job profile, and rendering the render job. The method also includes forwarding the rendered render job to a network storage system for retrieval by the client.

According to another embodiment of the invention, a computerized method for rendering images includes receiving a render job from a client at a first rendering site, transferring the render job from the first rendering site to a second rendering site. The second rendering site is located remote from the first rendering site. The method also includes rendering the render job at the second rendering site to produce a render result.

Embodiments of the invention provide numerous technical advantages. For example, according to one embodiment of the invention, rendering of multiple images may occur simultaneously due to a distributed architecture, allowing more rapid rendering. In addition, distributed rendering, either local or remote, allows efficient use of machines that may otherwise be under-utilized, which can reduce capital costs by reducing the number of machines that must be purchased, and also provides access by a user to more types and more powerful machines.

In some embodiments, distributed rendering, either local or remote, can reduce the number of render packages that must be purchased. For example, instead of purchasing "Maya" for each artists desktop, a smaller number of copies can be installed on a few machines in the distributed render system.

Other technical advantages are readily apparent to one skilled in the art from the following figures, descriptions, and claims.

BRIEF DESCRIPTION OF THE DRAWINGS

For a more complete understanding of the present invention and the advantages thereof, reference is now made to the following descriptions taken in connection with the accompanying drawings in which.

DETAILED DESCRIPTION OF THE INVENTION

Embodiments of the present invention and its advantages are best understood by referring now in more detail to FIGS. 1 through 17 of the drawings, in which like numerals refer to like parts.

Figure 1:
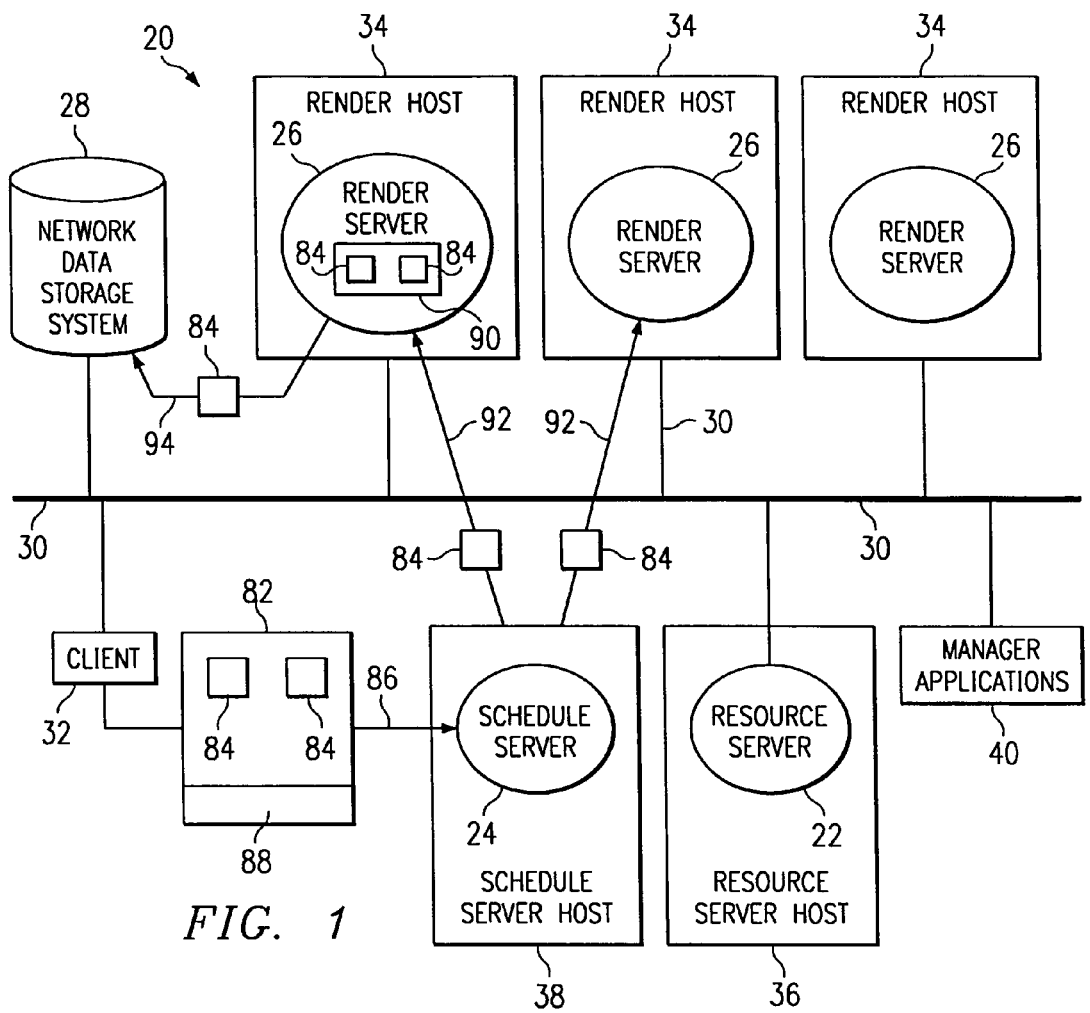
FIG. 1 is a block diagram of a local distributed rendering system according to the teachings of the invention.

FIG. 1 is a block diagram illustrating a local distributed rendering system 20 according to the teachings of the invention. Local distributed rendering system 20, which is also referred to as a render farm, may comprise a resource server host 36, a schedule server host 38, at least one render host 34, manager applications 40, and a network data storage system 28 interconnected via a network 30. Local distributed rendering system 20 may also include at least one client 32 connected to network 30.

In general, local distributed rendering system 20 may be used to process render jobs, such as graphic images or frames in a computer animation sequence, in a distributed manner. A client, such as client 32, may submit a render job to a schedule server 24, which is a component of schedule server host 38 that distributes the render job among one or more render hosts 34. In FIG. 1, a render job is represented by a render file 82, which is a computer file storing one or more render frames 84 and a job description 88. Render file 82 includes render frames 84 and job description 88 and is described in greater detail in conjunction with FIGS. 4 through 6B. Schedule server 24 may distribute frames to be rendered to several render hosts 34. In determining how to distribute the render job, schedule server 24 may communicate with a resource server 22, which is a component of resource server host 36 that includes a database of information regarding render hosts 34. The render job may then be rendered by render servers 26 within render hosts 34. The completed job may then be sent to network data storage system 28, where it can be accessed by client 32. By distributing a render job within local distributed rendering system 20, a render job may be matched to appropriate computers that have required licenses and software to perform a render task. Further, computers that may otherwise sit idle may be utilized, resulting in efficient use of computing resources.

Render host 34 may be a computer such as a personal computer, file server, workstation, minicomputer, mainframe, or any other computer capable of communicating and interconnecting with other computers. Each render host 34 may include a render server 26. Render server 26 is an application that renders render frames, depicted in this example by reference numeral 84, which in this example are submitted by client 32 via network 30. Render host 34 and render server 26 are further described below with reference to FIG. 2.

Resource server host 36 may be a computer such as a personal computer, file server, workstation, minicomputer, mainframe, or any other computer capable of communicating and interconnecting with other computers via network 30. In one embodiment, resource server host 36 may be a small computer, such as an O2 or Indy. Resource server host 36 may include a resource server 22. Resource server 22 is an application that tracks the resources available in local distributed rendering system 20 to process render frames 84 submitted by clients 32. Resource server 22 is further described below with reference to FIG. 3.

Schedule server host 38 may be a computer such as a personal computer, file server, workstation, minicomputer, mainframe, or any other computer capable of communicating and interconnecting with other computers via network 30. In one embodiment, schedule server host 38 may be a small computer, such as an O2 or Indy. Schedule server host 38 may include a schedule server 24. Schedule server 24 is an application that allocates render frames 84 to available resources in local distributed rendering system 20 to process render frames 84. In one embodiment, schedule server 24 receives render frames 84 from clients 32 and distributes them to various render servers 26 via network 30. Schedule server 24 may also track the progress of render frames 84 and notify the appropriate client 32 when a render job comprising render frame 84 has been completed.

Network data storage system 28 may store files that can be accessed by one or more of resource server 22, schedule server 24, render servers 26, and clients 32. Network data storage system 28 may be a computer such as a personal computer, file server, workstation, minicomputer, mainframe, or any other computer or storage device capable of storing data and communicating and interconnecting with other computers via network 30. In one embodiment, as shown in FIG. 1, network data storage system 28, resource server host 36, schedule server host 38, and each render host 34 are separate computers. In other embodiments, network data storage system 28, resource server host 36, schedule server host 38, and any render host 34 may be the same computer. For example, in one embodiment (not explicitly shown), schedule server host 38 may be the same computer as a particular render host 34 and resource server host 36 may be the same computer as another render host 34.

Manager applications 40 may be provided for monitoring and controlling the resources and scheduling activities of local distributed rendering system 20. Manager applications 40 are described in greater detail below with reference to FIG. 8.

Network 30 may be any type of computer or telecommunications network capable of communicating electronic data, such as a telephone line, cable, DSL, fiber-optic, or satellite-based communications network. In one embodiment, network 30 is a high bandwidth network operable to communicate large amounts of data, such as would be involved in transferring digital animation files.

Operation of local distributed rendering system 20 is described in greater detail in conjunction with the flow charts illustrated in FIGS. 4 through 6B. Additional details of render host 34 and resource server 22 are described in greater detail below in conjunction with FIGS. 2 and 3, respectively.

Figure 2:
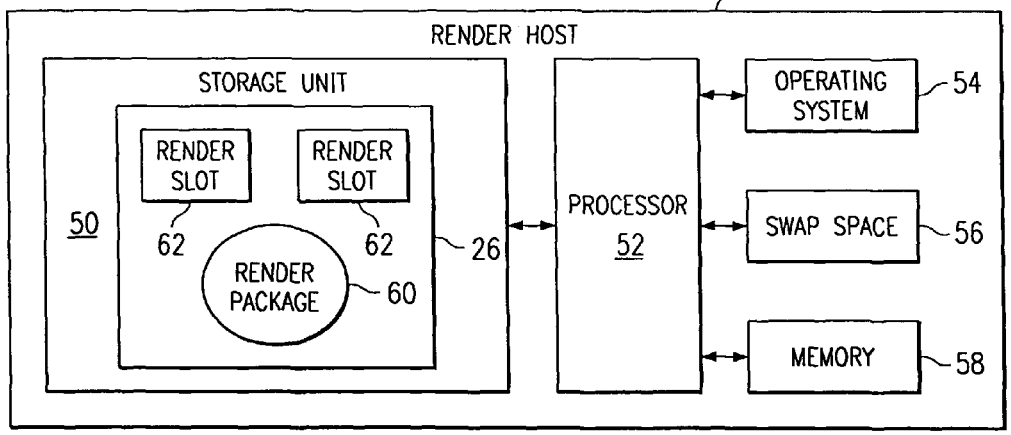
FIG. 2 is a block diagram of the render host of FIG. 1.

FIG. 2 is a block diagram of render host 34, showing additional details of the render host. Render host 34 may comprise at least one storage unit 50, at least one processor 52, an operating system 54 stored in a suitable storage area, swap space 56, and a memory 58, such as, for example, random access memory. Storage unit 50 may comprise a variety of types of storage media such as floppy disk drives, hard disk drives, CD-ROM drives, magnetic tape drives, or other suitable optical or magnetic storage devices. One or more render servers 26, including rendering package 60 may be stored in storage unit 50. Render servers 26 may comprise render slots 62 operable to accept render frames 84. Render slots 62 are "place-holders" where render frames 84 may be processed. Render slots 62 are either empty, in which case the render slot is idle, or full, in which case the render frame is being processed. In one embodiment, the number of render slots 62 determines the number of render frames 84 that may be concurrently processed by render server 26. In a particular embodiment, render server 26 creates one render slot 62 for each processor 52 in render host 34. In one embodiment, render server 26 may include one or more rendering packages 60, such as RenderMan or Maya, to process render frames 84 submitted by client 32. The arrangement of components in FIG. 2 is for illustrative purposes only, and thus may be otherwise arranged without departing from the scope of the present invention. For example, operating system 54 and/or swap space 56 may be stored on storage unit 50.

Suitable hardware (not explicitly shown) for implementing schedule server host 38 and resource server host 36 may also include a processor, memory, swap space, and a storage area in an analogous fashion, with associated server applications stored in memory or in the storage area.

Figure 3:
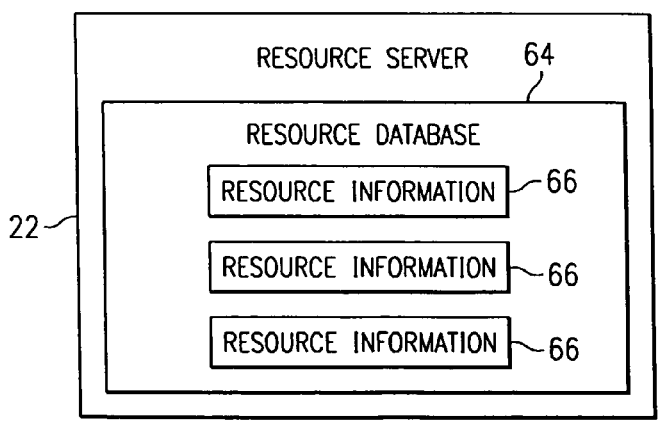
FIG. 3 is a block diagram of the resource server of FIG. 1.

FIG. 3 is a block diagram of resource server 22, showing additional details of the resource server. Resource server 22 may be stored in a memory or storage location in, or associated with, resource server host, or other suitable location. Resource server 22 may maintain a current resource database 64, which stores resource information 66 corresponding with render hosts 34 in local distributed rendering system 20. For each corresponding render host 34, resource information 66 may comprise any or all of the following information: the machine family of render host 34 (for example, SGI, Sun, or HP), the machine type of render host 34 (for example, O2, Indy or Octane), the family of operating system 54 (for example, Unix or Windows NT), the type of operating system 54 (for example, IRIX or Linux), the version of operating system 54, the number of processors 52, the family of each processor 52 (for example, Intel or MIPS), the type of each processor 52 (for example, R5K or R10K), the speed of each processor 52, the amount of random access memory (RAM) 58 available, the amount of swap space 56 available, and a list of software licenses available on render host 34. Resource database 64 may also comprise information about render slots 62, including the number of render slots 62 that are busy and the number of render slots 62 that are available to accept a new render frame 84. Resource database 64 may comprise other information without departing from the scope of the present invention. As discussed below with reference to FIGS. 8 and 9, the information in resource database 64 may be obtained by communication between resource server 22 and render servers 26 via network 30.

Figure 4:
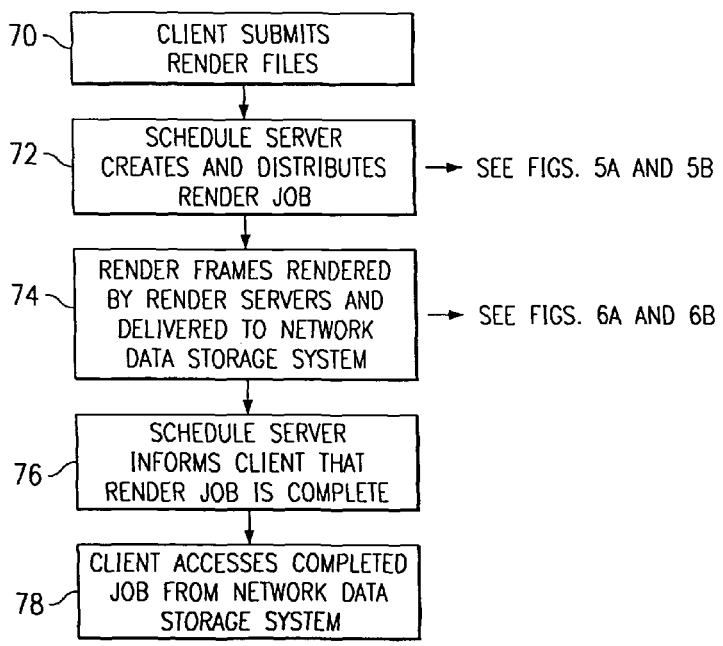
FIG. 4 is a flow chart illustrating a method for processing a render job according to the teachings of the invention.

FIG. 4 is a flow chart illustrating a method for processing a render job in distributed rendering system 20 according to the teaching of the invention. FIG. 4 illustrates a general method, and FIGS. 5A, 5B, 6A, and 6B provide further details of portions of this method.

As shown in FIGS. 1 and 4, at step 70, a client 32 may submit one or more render files 82 having at least one render frame 84 to schedule server 24. Step 70 is represented by arrow 86 in FIG. 1. A job description 88 corresponding with render files 82 may be submitted along with render files 82. Job description 88 may be used by schedule server 24 in distributing render files 82 to render servers 26.

Job description 88 may comprise information regarding render files 82, including the number of render frames 84, the size of each render frame 84, desired resolution of rendered images, starting and ending frame numbers to be produced, user and group identification of client 32 submitting render files 82, the priority of render files 82, and an email or other address of client 32. Job description 88 may further comprise information regarding hardware and/or software to be used in processing render files 82, including: the family and type of machine of render host 34; the number, family, type, and speed of processors 52; the family, type, and version of operating system 54; the amount of random access memory (RAM) 58; the amount of swap space 56; and a list of applications, such as rendering packages 60, texture maps and plug-ins. Render job description 88 may comprise other information without departing from the scope of the present invention.

In one embodiment, job description 88 may be manually input by client 32, automatically created by a client application, or created by a combination of these methods. Render files 82 and job description 88 may be submitted to schedule server 24 by a client application. In one embodiment, render files 82 and job description 88 may be submitted to schedule server 24 by an X/Motif application that gathers and submits information used to create job description 88.

At step 72, schedule server 24 may create a render job 90 and distribute render frames 84 to one or more render hosts 34 to process render job 90 (FIG. 1). Render job 90 may comprise render files 82 having render frames 84 submitted by client 32 and information from job description 88. Schedule server 24 may communicate with render server 26 to determine how to allocate render frames 84 of render job 90 to render hosts 34, and distribute render frames 84 to render hosts 34 via network 30. In one embodiment, schedule server 24 may distribute render frames 84 of render job 90 among several render hosts 34 in order to process render job 90. For example, schedule server 24 may distribute render frames 84 to several render hosts 34, as represented by arrows 92 in FIG. 1. Step 72 is described below in further detail with reference to FIGS. 5A and 5B.

At step 74, render frames 84 that have been distributed to one or more render hosts 34 may be processed by render servers 26 located on render hosts 34, and completed, or rendered, render frames 84 may be delivered to network data storage system 28, as represented by arrow 94 in FIG. 1. Render server 26 may interface with a rendering package 60, such as RenderMan or Maya, to perform the actual rendering of render frames 84. Step 74 is described below in further detail with reference to FIGS. 6A and 6B.

At step 76, after each render frame 84 in render job 90 has been rendered and delivered to network data storage system 28, client 32 may be notified that render job 90 has been completed. In one embodiment, schedule server 24 sends client 32 an email via network 30 informing client 32 that render job 90 has been completed. At step 78, client 32 may access the completed render job 90 from network data storage system 28, and the method is concluded.

Figure 5A:
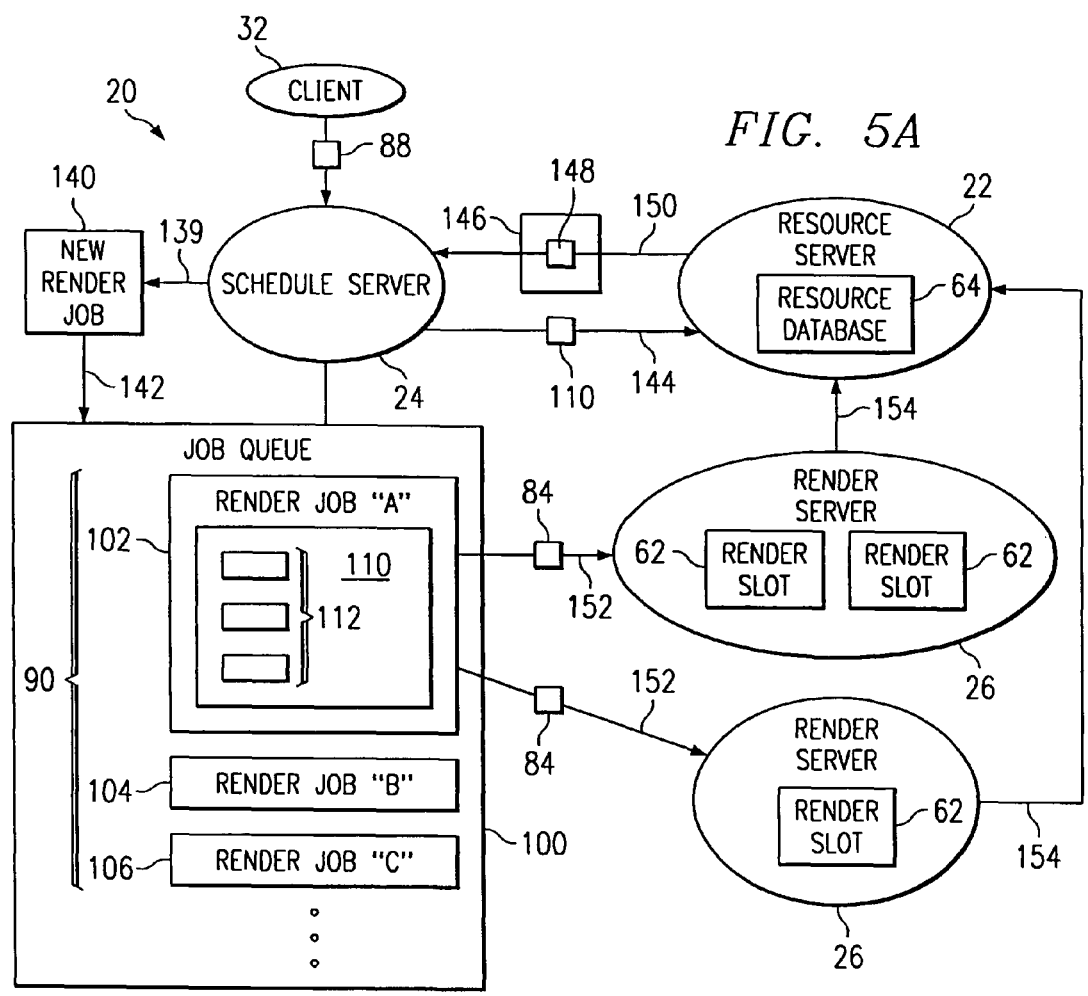
FIG. 5A is a block diagram showing certain portions of the local distributed rendering system of FIG. 1 that are associated with creating render jobs and distributing render frames.

FIG. 5A is a block diagram showing certain portions of local distributed rendering system 20 and associated files that facilitate further description of step 72 of schedule server 24 creating and distributing a render job. Schedule server 24 may maintain at least one job queue 100 in order to manage and process multiple render jobs 90 concurrently. Job queue 100 may be stored with schedule server host 24 on schedule server host 38, stored on other portions of schedule server host 38, or stored in other suitable locations, but for clarity of description are depicted in FIG. 5A external to any particular storage device or area. Render jobs 90 may be held in a particular job queue 100 depending on the processing status of particular render jobs 90.

Render jobs 90 in job queue 100 may be ordered in priority order, based at least in part on information submitted by client 32. For example, as shown in FIG. 5A, render job "A" 102 is higher priority than render job "B" 104, which is in turn higher priority than render job "C" 106, and so on. Render jobs 90 are generally rendered in order from highest to lowest priority. This priority ordering may ensure that render resources, including render servers 26, are first assigned to the most important or highest priority render jobs 90.

As previously described, each render job 90 may comprise one or more render frames 84, as illustrated in FIG. 1. As shown with regard to render job "A" 102 in FIG. 5A, each render job 90 may also have a corresponding resource profile 110 created by schedule server 24 and based at least in part on job description 88. Resource profile 110 may include any information included in job description 88 and any other suitable information, and is used by schedule server 24 to allocate render jobs 90 to appropriate render servers 26. Resource profile 110 may comprise a number of resource fields 112 containing information regarding render files 82.

Resource fields 112 may allow the use of "don't care" values, allowing schedule server 24 to create flexible resource profiles 110. For example, a particular resource profile 110 for render files 82 may specify that a MIPS processor is required, but that the type (for example, R5K or R10K) does not matter for processing render files 82. Similarly, a resource profile 110 may specify that RenderMan is the required rendering package 60 for processing render files 82, but that the version of RenderMan does not matter.

"Don't care" values may also be used, for example, for the major, minor and dot version numbers of operating system 54, rendering package 60, and other hardware and software versions. For example, a resource profile 110 may specify that IRIX version 6.5 must be used to process render files 82. Using a "don't care" value for the minor version number, resource profile 110 may allow any version 6.X of IRIX to be used, such as versions 6.3 or 6.6. Using a "don't care" value for the major and minor version numbers, resource profile 110 may allow any version of IRIX to be used. Additional details of step 72 of schedule server 24 creating and distributing a render job are described below in conjunction with FIG. 5B and with additional reference to FIG. 5A.

Figure 5B:
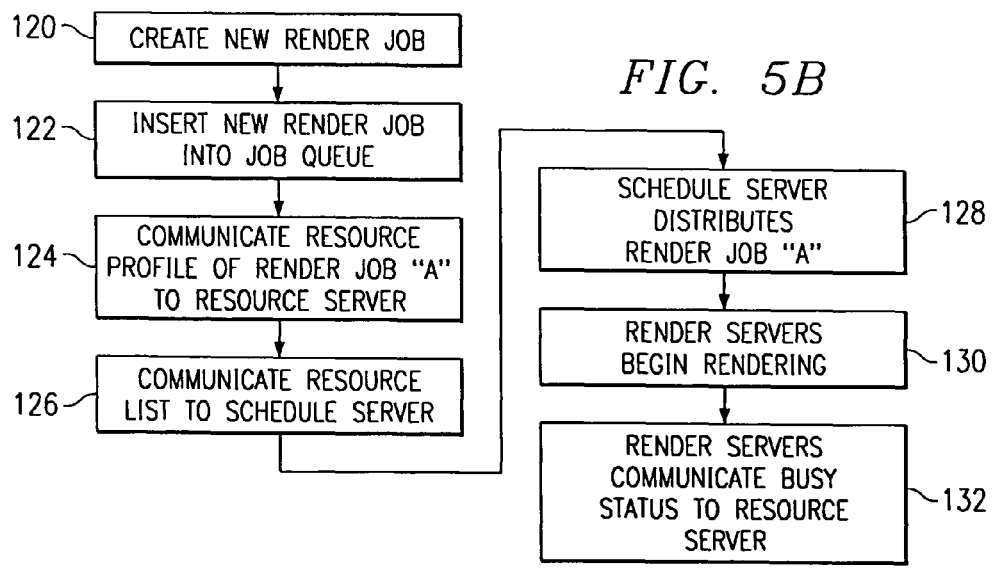
FIG. 5B is a flow chart illustrating a method of creating render jobs and distributing render frames using the system of FIG. 5A.

FIG. 5B is a flow chart illustrating example details associated with creating render jobs 90 and distributing render frames 84 within local distributed rendering system 20, as illustrated in FIG. 5A. At step 120, schedule server 24 may create a new render job 140 based at least in part on information from job description 88 received from a client 32, such as previously described with reference to steps 70 and 72 of FIG. 2. Creation of new render job 140 is depicted by reference numeral 139 in FIG. 5A. Schedule server 24 may create resource profile 110 associated with new render job 140 based at least in part on job description 88.

At step 122, schedule server 24 may insert new render job 140 into job queue 100 in priority order according to the priority of new render job 140, as depicted by reference numeral 142 in FIG. 5A. For example, new render job 140 having a priority value of "3" would be inserted between render job "B" 104 having a priority value of "2" and render job "C" 106 having a priority value of "5."

At step 124, schedule server 24 may begin the process of distributing the render job 90 at the top of job queue 100. In one embodiment, the render job 90 at the top of job queue 100 is the highest priority render job 90 in job queue 100, as shown in FIG. 5A as render job "A" 102. Schedule server 24 may begin the process of distributing render job "A" 102 by communicating resource profile 110 corresponding with render job "A" 102 to resource server 22 via network 30. Step 124 is represented by arrow 144 in FIG. 5A.

In response, at step 126, resource server 22 may send a resource list 146, based at least in part on resource database 64, to schedule server 24 via network 30. Step 126 is represented by arrow 150 in FIG. 5A.

In one embodiment, resource list 146 may comprise a list of machines, such as render hosts 34 (FIG. 1), in render system 20 that match resource profile 110. In a particular embodiment, resource list 146 may comprise a list of machines, such as render hosts 34, that match resource profile 110 and that have render slots 62 that are free to accept render frames 84 of render job "A" 102. In another embodiment, resource list 146 may comprise host information 148, generally detailing the hardware and software configuration of render hosts 34. In yet another embodiment, resource list 146 may comprise resource information 66, as described with reference to FIG. 3. Resource server 22 and render servers 26 may communicate with each other in order for resource server 22 to generate updated resource lists 146, as described in greater detail below with reference to FIG. 8.

At step 128, schedule server 24 may distribute render frames 84 of render job "A" 102 to render servers 26 to perform rendering of render frames 84. Schedule server may determine how to distribute render frames 84 based at least in part on information from resource list 146, such as which render servers 26 have render slots 62 available to accept render frames 84. In one embodiment, as shown in FIG. 5A, schedule server 24 may distribute render frames 84 to render slots 62 of several render servers 26, as represented by arrows 152 in FIG. 5A.

At step 130, render servers 26 may begin the rendering of render frames 84 of render job "A" 102. Render server 26 may interface with a rendering package 60, such as RenderMan or Maya, to perform the actual rendering of render frames 84.

At step 132, render servers 26 having render slots 62 that have accepted render frames 84 of render job "A" 102 may communicate to resource server 22 the busy status of such render slots 62, as depicted by arrows 154 in FIG. 5A. Resource database 64 may be updated accordingly.

In this manner, schedule server 24 may create and distribute render jobs for rendering. Actual rendering of render frames and delivering the render frames to a network data storage system is described below in conjunction with FIGS. 6A and 6B.

Figure 6A:
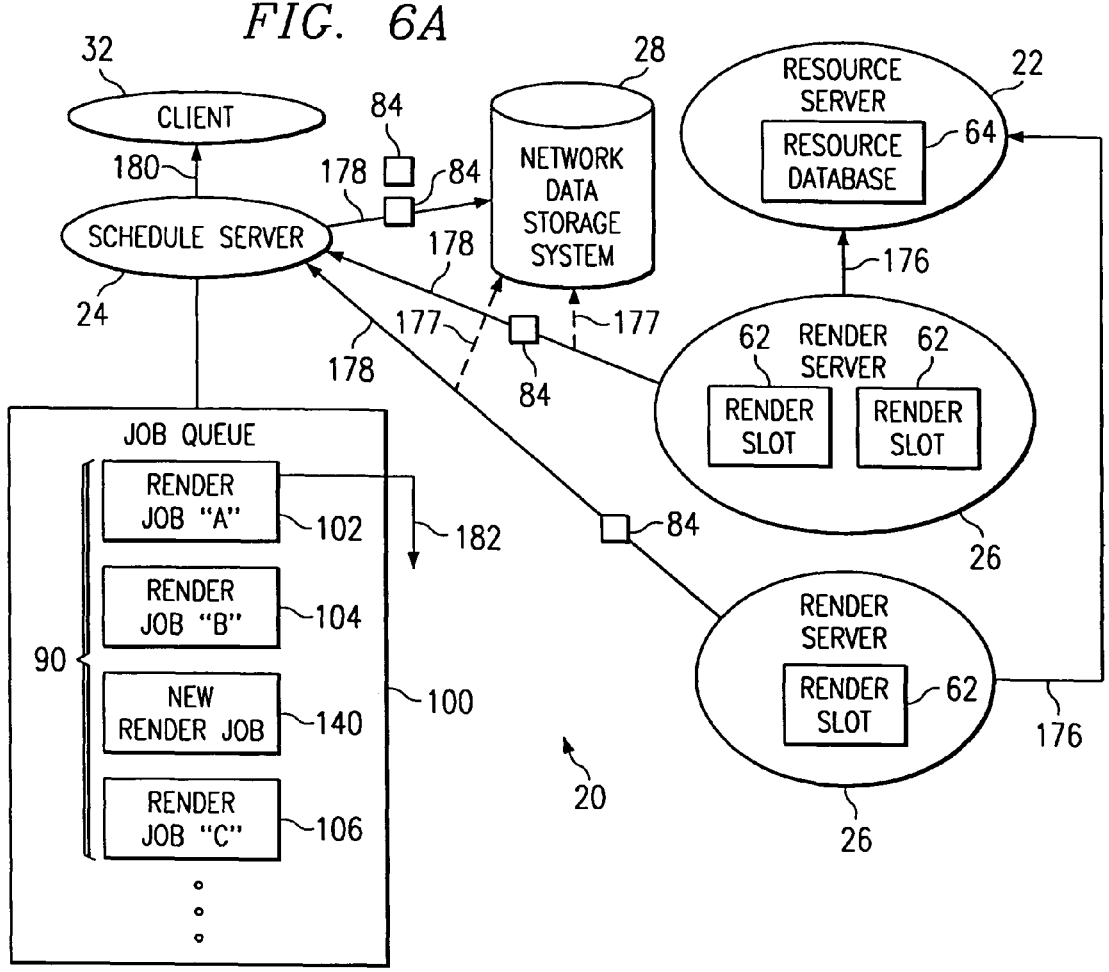
FIG. 6A is a block diagram showing certain portions of the local distributed rendering system of FIG. 1 that are associated with rendering frames and delivering the rendered frames to a network data storage system.
Figure 6B:
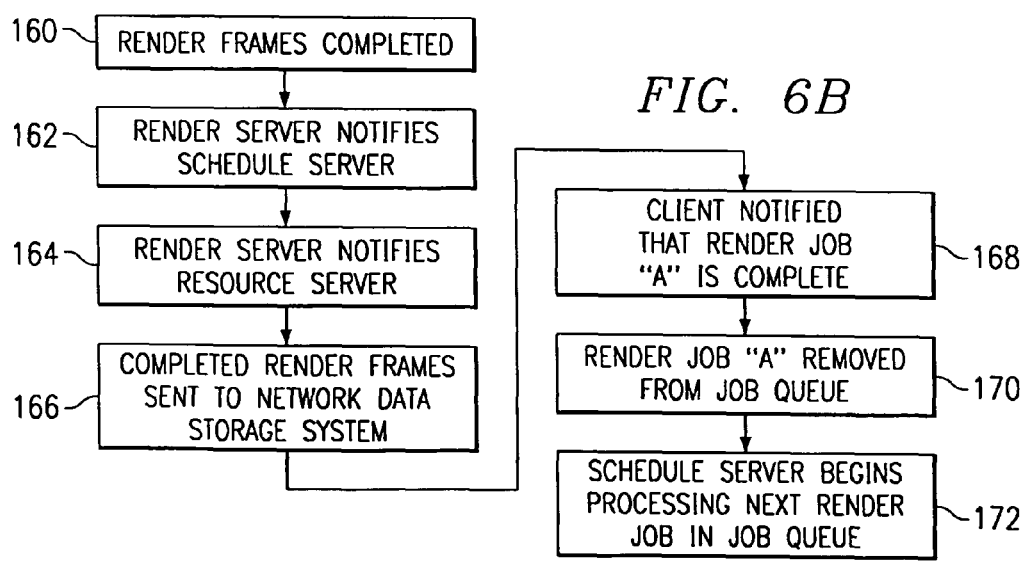
FIG. 6B is a flow chart illustrating one method of completing render jobs performed using the system of FIG. 6A.

FIG. 6A is a block diagram showing certain portions of local distributed rendering system 20 and associated files that facilitate further description of step 74 of rendering frames by render servers 26 and delivering the rendered frames to network data storage system 28. The components of FIG. 6A are described in detail with reference to FIGS. 2, 3 and 5A. FIG. 6B is a flow chart illustrating one method of rendering frames by render servers 26 and delivering the rendered frames to network data storage system 28. The method illustrated by FIG. 6B may follow the method illustrated by FIG. 5B above.

At step 160, the rendering of render frames 84 of render job "A" 102 may be completed. At step 162, render servers 26 may notify schedule server 24 as each render frame 84 is completed, as depicted by reference numeral 176. At step 164, render servers 26 may notify resource server 22 as each render frame 84 is completed. In particular, render servers 26 may communicate the available, or "not busy" status, of render slots 62 in which the rendering of render frames 84 has been completed. Resource database 64 may be updated accordingly.

At step 166, completed render frames 84 may be sent to network data storage system 28 via network 30, as depicted by reference numeral 177. In one embodiment, render frames 84 may be sent to schedule server 24 as each render frame is completed before being sent to network data storage system 28, as depicted by reference numeral 178. In a particular embodiment, schedule server 24 may package render frames 84 of render job "A" 102 and send the packaged frames to network data storage system 28.

At step 168, client 32 may be notified that render job "A" 102 has been completed, as depicted by reference numeral 180. In one embodiment, schedule server 24 may send client 32 an email via network 30 informing client 32 that render job "A" 102 has been completed.

At step 170, schedule server 24 may remove render job "A" 102 from job queue 100, as shown by arrow 182 in FIG. 6A. Each render job 90 remaining in job queue 100 may then move up in the priority order.

At step 172, schedule server 24 may begin the method for processing the new highest priority render job 90 in job queue 100; however, in some embodiments with sufficient render servers this step 172 may also occur while rendering of frames from previous render jobs continues and before the previous render job has been completed. As shown in FIG. 6A, schedule server 24 may begin the process for processing render job "B" 104. For example, schedule server 24 may return to step 124 of the method illustrated by FIG. 5B, communicating resource profile 148 of render job "B" 104 to resource server 22. Schedule server 24 may continue down job queue 100 in this manner as render jobs 90 are completed and removed from job queue 100.

Figure 7:
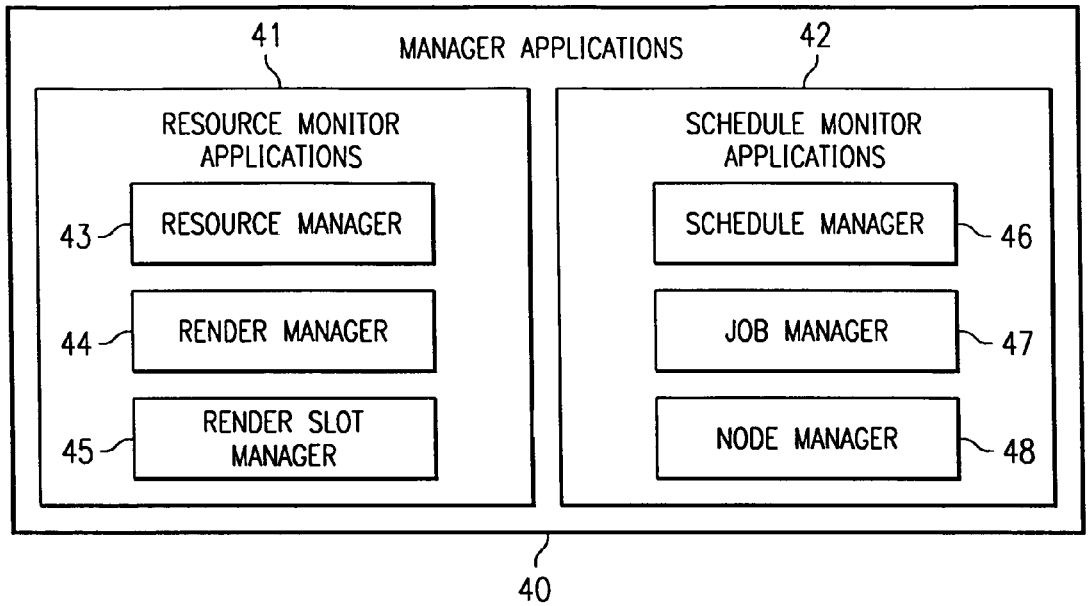
FIG. 7 is a block diagram illustrating manager applications associated with the local distributed rendering system of FIG. 1, including resource monitor applications and scheduling monitor applications.

FIG. 7 illustrates manager applications 40, which may be provided for monitoring and controlling the resources and scheduling activities of local distributed rendering system 20. Manager applications 40 may be associated with and processed on any suitable computing system and may include resource monitor applications 41 and schedule monitor applications 42.

Resource monitor applications 41 may be provided to monitor and control the resources in local distributed rendering system 20. Resource monitor applications 41 may include a resource manager 43, one or more render managers 44, and one or more render slot managers 45. In one embodiment, resource monitor applications 41 communicate with resource server 22 and/or render servers 26 to monitor and control the rendering environment. In a particular embodiment, resource monitor applications 41 are X/Motif client applications.

Resource manager 43 is an application that may be coupled to resource server 22 and may be operable to start and stop resource server 22. Resource manager 43 may also be operable to start and stop particular render servers 26. In addition, render manager 43 may be operable to obtain a list of all render hosts 34 in local distributed rendering system 20 upon which a render server 26 is operating.

Render manager 44 is an application that may be coupled to render servers 26. In one embodiment, one render manager 44 is coupled to each render server 26. Render manager 44 may be invoked by resource manager 43. Render manager 44 may be operable to view the hardware and/or software configurations of render host 34 upon which the associated render server 26 resides. For example, render manager 44 may be able to view the list of render packages 60 or render package licenses installed on render host 34. Render manager 44 may also be able to view which render slots 62 are busy or available. In addition, render manager 44 may be operable to stop render server 26 on a particular render host 34.

Render slot manager 45 is an application that may be coupled to render slots 62. In one embodiment, one render slot manager 45 is coupled to each render slot 62. Render slot manager 45 may be invoked by render manager 44. Render slot manager 45 may be operable to view the activities of render slot 62, such as processor usage, input/output, and memory usage. In addition, render slot manager 45 may be operable to stop, or kill, a rendering process.

Schedule monitor applications 42 may be provided to monitor and control the scheduling activities in local distributed rendering system 20. Schedule monitor applications 42 may include a schedule manager 46, a job manager 47, and one or more node managers 48. In one embodiment, schedule monitor applications 42 communicate with schedule server 24 and/or render servers 26 to monitor and control rendering jobs 90. In a particular embodiment, resource monitor applications 42 are X/Motif client applications.

Schedule manager 46 is an application that may be coupled to schedule server 24 and may be operable to start and stop schedule server 24. Schedule manager 46 may also be operable to view job queues 100.

Job manager 47 is an application that may be coupled to schedule server 24. Job manager 47 may be invoked by schedule manager 46. Job manager 47 may be operable to view the status of individual render jobs 90. This status may include a list of render frames 84 within render job 90 and the render hosts 34 and/or render servers 26 to which they have been distributed. Job manager 47 may also be operable to release, out-source, and stop, or kill, individual render jobs 90.

Node manager 48 is an application that may be coupled to render slots 62. In one embodiment, one node manager 48 is coupled to each render slot 62. Node manager 48 may be invoked by job manager 47. Node manager 48 may be operable to view the activities of an individual render frame 84 within a render job 90, such as processor usage, input/output, and memory usage. In addition, node manager 48 may be operable to stop, or kill, processing of a render frame 84.

As described in greater detail below, manager applications 40 facilitate initiation and proper operation of local distributed computing system 20.

The above description focuses on local distributed rendering system 20 processing rendering jobs once the system is running. The following description made in conjunction with FIGS. 8 through 10 addresses transient conditions that may occur while local distributed rendering system 20 is being initiated and/or while it is operational.

Figure 8:
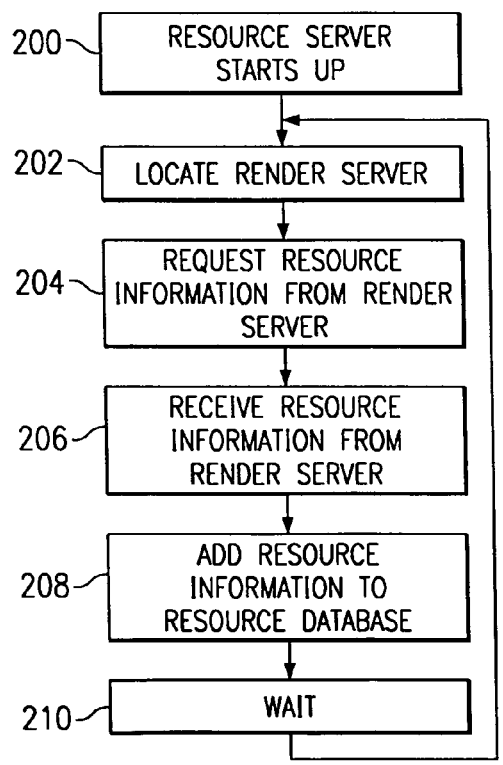
FIG. 8 is a flow chart illustrating a method of creating and maintaining a resource database used in the render host of FIG. 2.

FIG. 8 is a flow chart illustrating a method of creating and maintaining resource database 64 of resource server 22. This method is described with reference to both FIGS. 1 and 8. At step 200, resource server 22 may start up or connect to network 30. At step 202, resource server 22 may locate render servers 26 via network 30. Step 202 is described below in greater detail with reference to FIG. 10. At step 204, resource server 22 may request resource information 66 from render servers 26.

At step 206, resource server 22 may receive resource information 66 (FIG. 3) from render servers 26. Several types of resource information 66 may be sent from render servers 26 to resource server 22. For example, when a new render server 26 is located, or in any other suitable situation, render server 26 may send resource server 22 resource information regarding the hardware and software configurations of render host 34 associated with render server 26, such as described with reference to FIG. 3. For example, such resource information 66 may comprise any or all of the following information: the machine family and type of render host 34, the family, type and version of operating system 54, the number, family, type, and speed of processors 52, the amount of random access memory (RAM) 58 available, the amount of swap space 56 available, the rendering packages 60 available, and a list of software licenses available on render host 34.

Resource information 66 may also comprise information about render slots 62 (FIG. 2), including the number of render slots 62 that are busy and the number of render slots 62 that are available to accept a new render job 90. When render server 26 is processing render frames 84 of a render job 90, render server 26 may communicate the availability status of render slots 62. For example, render server 26 may communicate a busy status regarding render slot 62 each time render slot 62 accepts a new render frame 84. Similarly, render server 26 may communicate an available, or not busy, status regarding render slot 62 each time render slot 62 completes a render frame 84.

At step 208, resource server 22 may update resource database 64 based on resource information 66 received from render servers 26. For instance, resource database 64 may be updated each time render slots 62 become busy or available. In addition, resource-information 66 regarding a particular render server 26 may be removed from resource database 64, such as if render server 26 is terminated, turned off, or disconnected from network 30.

At step 210, resource server 22 may wait for a period of time and return to step 202 or step 204 to periodically check for new render servers 26 and current resource information 66. Communications between the resource server 22 and render servers 26 may be designed to automatically recover and rebuild resource database 64 if any resource server 22 or render server 26 fails, shuts down, or becomes disconnected from network 30. For example, render servers 26 may automatically reload resource database 64 with resource information 66 in the event that resource server 22 is terminated and restarted. As previously discussed with reference to FIGS. 5A and 5B, resource database 64 may be used by schedule server 24 to determine how to distribute render frames 84 of render jobs 90 to render servers 26.

The method illustrated in FIG. 8 can thus be used to collect information from any number of computers or servers within a network, and to create and maintain a current database of such information. In particular, the method can be used in a transient environment, such as where computers and/or servers are starting up or shutting down.

Figure 9:
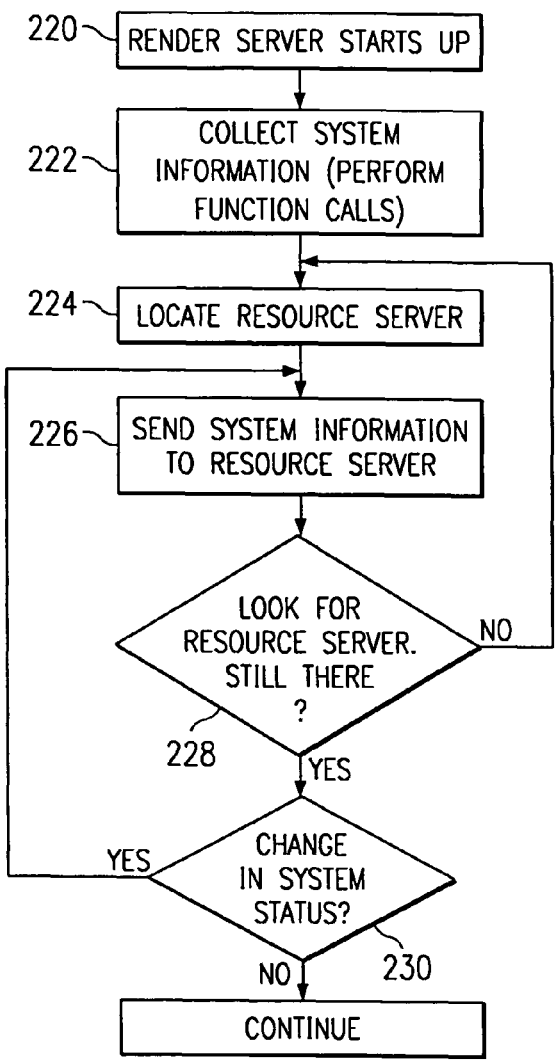
FIG. 9 is a flow chart illustrating a method of initializing the render server shown in FIG. 2.

FIG. 9 is a flow chart illustrating a method of initializing a render server 26. At step 220, render server 26 may start up or connect to network 30. At step 222, render server 26 may collect information, such as hardware and/or software configurations, regarding render host 34 on which render server 26 is located. In one embodiment, render server 26 may collect resource information 66, such as described with reference to FIGS. 3 and 9. Render server 26 may use function calls to probe render host 34 to collect resource information 66. Thus, render server 26 may automatically collect resource information 66 regarding host 34, which may eliminate or reduce the need for manual collection of resource information 66, such as by a user or client 32. Although described with reference to render server 26, step 222 may be performed by any computer or server in local distributed rendering system 20. According to one embodiment, Unix function calls are utilized at step 222 to collect resource information 66. For example, the Unix function call "systinfo( )" is used to retrieve (1) Machine Family, i.e., SGI, SUN, etc.; (2) OS Family, i.e. Unix; (3) OS type, i.e., IRIX, Linux, Solaris; (4) OS release (major and minor); (5) number of CPU's; (6) CPU family, i.e., MIPS, Intel, etc.; and (7) CPU type, i.e., R5000, R1000, etc. Further, the Unix function calls "Sentinent( )", "getivent( )", and "endinvent( )" examine hardware inventory and obtain the associated CPU speed and amount of memory. In addition, the Unix function call "swapactl( )" is used to return <stdio.h>, which handles open, read, and close operations, are used to read license files to determine what render packages are available.

At step 224, render server 26 may locate resource server 22 via network 30. Step 224 is described below in greater detail with reference to FIG. 10. At step 226, after locating resource server 22, render server 26 may send resource information 66 to resource server 22 via network 30. Resource information 66 may be inserted into resource database 64. At step 228, render server 26 may periodically look for resource server 22 to determine whether resource server 22 has been terminated, turned off, or disconnected from network 30. In one embodiment, render server 26 looks for resource server 22 using the method described below with reference to FIG. 10. If resource server 22 is not located, render server 26 may return to step 224 to locate resource server 22.

At step 230, render server 26 may determine whether a change in the status of render server 26 or render host 34 has occurred. In one embodiment, render server 26 may check resource information 66 periodically or in response to a particular occurrence, such as render server 26 accepting render frames 84 for processing. If a change has occurred, render server 26 may notify resource server 22. For example, if a new rendering package 60 is installed on render host 34, render server 26 may notify resource server 22 such that resource server 22 can update resource database 64. Similarly, if a render slot 62 in render server 26 has accepted a render frame 84, render server 26 may notify resource server 22 of the busy status of render slot 62 such that resource server 22 may update resource database 64.

The method illustrated in FIG. 9 can thus be used to collect system information regarding computers or servers in order to create and maintain an updated database of such information. In particular, the method can be used in a transient environment, such as where computers and/or servers are staring up or shutting down.

Figure 10:
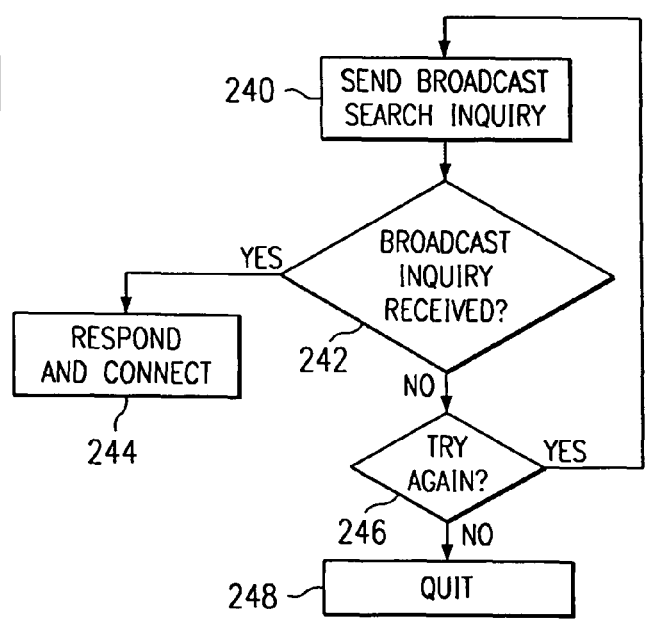
FIG. 10 is a flow chart illustrating a method of locating the render server application of FIG. 2 in the network of FIG. 1.

FIG. 10 is a flow chart illustrating a method of locating render server 22. The method of FIG. 10 is described with reference to resource server 22 attempting to locate render server 26; however, the method of FIG. 10 may be used by any application to locate any other application.

At step 240, resource server 22 may send a broadcast search inquiry across network 30. In one embodiment, resource server 22 may send a UDP broadcast message. At step 242, the broadcast message may or may not be received by render server 26. If the broadcast message is received by render server 26, render server 34 may respond to resource server 22 via network 30, and communications between render server 26 and resource server 22 may be established at step 244. If the broadcast message is not received by render server 26, resource server 22 may proceed to step 246.

At step 246, resource server 22 may try again by returning to step 240 and sending another broadcast message across network 30, or proceed to step 248 and quit searching for render server 26.

In one embodiment, resource server 22 may use the method described in FIG. 10 to locate several or all render servers 26 in local distributed rendering system 20. This may be done so that resource server 22 can collect resource information 66 from each render server 26 in order to create and/or maintain resource database 64.

Thus, the methods illustrated in FIGS. 8, 9 and 10 can be used to collect information from any number of computers or servers within a network, and to create and maintain a current database of such information. In particular, the method can be used in a transient environment, such as where computers and/or servers are staring up or shutting down.

One aspect of the invention relates to remote distributed rendering in which more than one distributed rendering system 20 cooperates to accommodate rendering jobs. This aspect of the invention is described below in conjunction with FIGS. 11 through 17.

Figure 11:
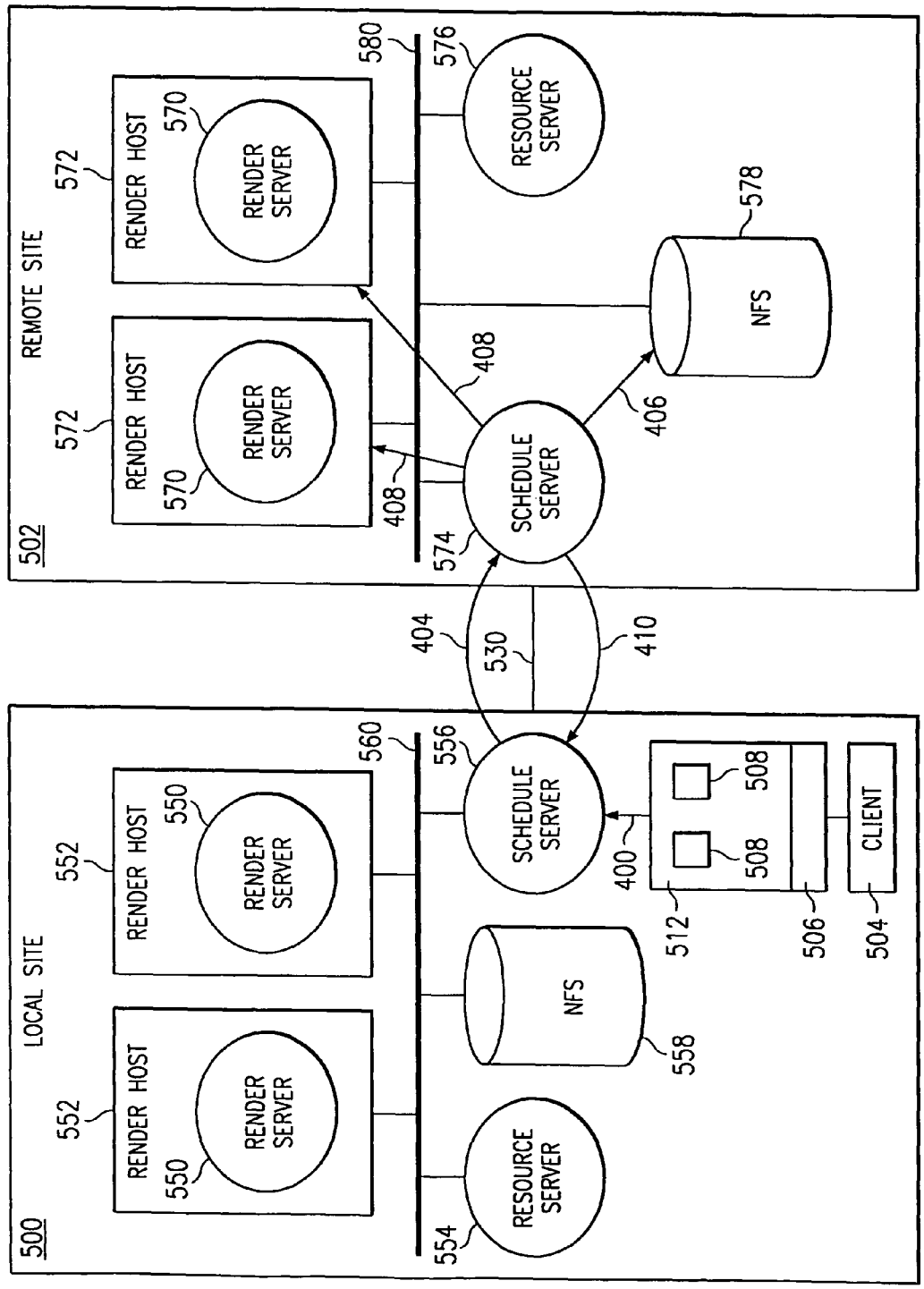
FIG. 11 is a block diagram of a remote distributed rendering system according to the teachings of the invention.

FIG. 11 is a block diagram of a remote distributed rendering system 600 according to the teachings of the invention. Remote distributed rendering system 600 includes one or more local, or client, sites depicted as local site 500, coupled to at least one remote site 502 via a network 530. Local site 500 and remote site 502 are each substantially similar to local distributed rendering system 20 shown in FIG. 1. In general, local site 500 and its components operate in substantially the same manner as local distributed rendering system 20, but have the capability of outsourcing render jobs to remote sites associated with remote render farms, or remote sites with associated schedule servers and resource services. Similarly, remote site 502 and its components operate in substantially the same manner as local distributed rendering system 20, but have the capability of receiving an outsourced rendering job and returning a result to local site 500. By outsourcing render jobs to remote render farms, efficient use of computing resources, including site licenses, may be effected.

Local site 500 may include at least one render host 552, a render server 550 associated with each render host 552, a schedule server 556, a resource server 554, and a storage device such as network file server ("NFS") 558 all of which are interconnected via network 560. Although FIG. 11 depicts the components of local site 500 as separate machines, several of the components may be located on one machine, though ideally there will be more than one render server machine.

Remote site 502 may include at least one render host 572, a render server 570 associated with each render host 572, a schedule server 574, a resource server 576, and a storage device such as NFS disk 578 all coupled via network 580. Local site 500 and remote site 502 may share access to one NFS disk, though for clarity this variation is not illustrated in FIG. 11. Although FIG. 11 depicts the components of remote site 502 as separate machines, it is feasible for several of the components to be located on one machine, though certain advantages may be realized by utilizing more than one render server machine. Remote site 500 is coupled to local site 502 via network 530. Remote site 500 has a range of capabilities that enable it to process a wide range of jobs outsourced by one or more local sites 500. Remote site 500 can also be networked with other remote sites to allow the transparent processing of outsourced rendering jobs that a particular remote site does not have the capabilities or processing bandwidth to handle.

Remote distributed rendering system 600 may be used to process any type of render job, such as graphic images or frames in computer generated animation sequences, in a remote distributed manner. In a typical use of a remote distributed rendering system, the local site outsources rendering jobs to a remote site (or sites) via a network, the remote site (or sites) processes the rendering jobs and the rendered jobs are returned to the local site by the remote site (or sites). This description refers to the end product as an image, but the end product could easily be any type of job for which a client desires rendering capabilities.

In general, a client may submit a render job to schedule server 556 of local site 500, which then outsources the rendering job to one or more remote sites, such as remote site 502, via a network connection, such as network 530. Remote site 502, or a combination of remote sites, then processes the rendering jobs and returns the rendered jobs to NFS 558 at local site 500 where it may be accessed by client 504. Additionally, because jobs that are outsourced to remote sites are frequently large, remote site 502 may send client 504 a periodic communication, such as an email, that advises the client of the job status and in some cases samples of the rendered job so that a job may be canceled if the results are not satisfactory.

Remote distributed rendering system 600 provides several advantages for rendering. Primarily, system 600 potentially provides a customer with greater resources than are available on a local rendering site. For example, the machines included within remote site 502 may contain faster processors that can process large rendering jobs more quickly than the local site. Additionally, the client site may not contain a software version necessary to complete the rendering job, whereas the remote site may have that particular version.

As stated above, local site 500 is substantially similar to local distributed rendering system 20 depicted in FIG. 1. The descriptions of local distributed system's 20 components and operations illustrated in FIGS. 1 through 10 and described above are hereby incorporated in the description of remote distributed rendering system 600. Remote site 502 may also be substantially similar to local site 500 in terms of its components, although the particular capabilities such as processor speed, programs, etc. may differ. Remote site 502 also contains additional functionality that allows it to perform remote distributed rendering described below with reference to FIGS. 14, 15, and 16.

Network 530, coupling local site 500 and remote site 502, may be any type of computer or telecommunications network capable of communicating electronic data, such as a telephone line, cable, DSL, fiber-optic, or satellite-based communications network. In one embodiment, network 530 is a high bandwidth network operable to communicate large quantities of data, such as would be involved in the outsourcing of digital animation files. Rendering of render jobs is described below in conjunction with FIGS. 12 through 15.

Figure 12:
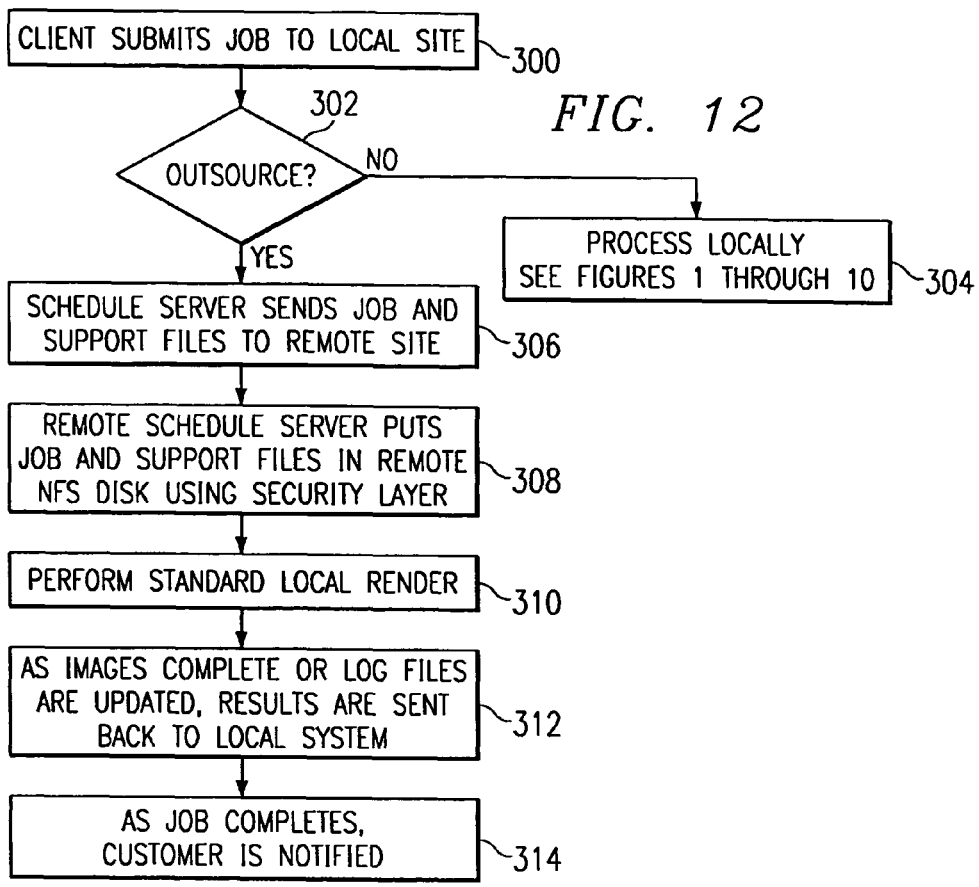
FIG. 12 is a flow chart illustrating a method for remote processing of a render job by the remote distributed rendering system of FIG. 11.

FIG. 12 is a flow chart illustrating a method for remote processing of a render job by remote distributed rendering system 600. As shown in FIG. 12 at step 300, a client 504 may submit render files 512 (FIG. 11) that have at least one render frame 508 to local schedule server 556 in substantially the same manner and format as described regarding local rendering system 20 in FIG. 1. Step 300 is also represented by arrow 400 in FIG. 11. Job description 506 corresponding with render files 512 may be submitted along with render files 512, and in one embodiment, job description 506 may include a request for remote rendering of the job. Job description 506 may further include substantially the same information described in reference to step 70 on FIG. 4.

At step 302, depending on whether the job description 506 specifies the associated job as a job for remote rendering or one for local rendering, schedule server 556 sends the associated job to either render hosts 552 on local site 500 or to schedule server 574 on remote site 502. Local site 500, including schedule server 556, may also be configured such that schedule server 556 may make the decision to process a job remotely based on various criteria such as traffic on local render servers 550. In the case where job description 506 specifies the job as one to be processed locally, shown at step 304, the local rendering method described with reference to FIGS. 1 through 10 applies. When job description 506 specifies the job as one to be processed remotely, step 306 is invoked.

At step 306, local schedule server 556 sends the submitted job and any necessary or specified support files to the appropriate remote site for processing via network 530. The entire package that is delivered to the remote site may include job description 506, render files 512 that have at least one render frame 508, and any necessary support files. The support files may include texture maps, plug-ins, additional scripts from client 504, etc. In this embodiment, the job and these support files, which are generally located on NFS disk 558, are packaged into a single file. In this example, the packaged file is compressed using the Unix "tape archive," or "tar" format; however, the packaged file could be compressed using other formats or be delivered in an uncompressed format. In determining the appropriate remote site 502, local schedule server 556 may deliver the job to the remote site 502 specified by the client. In another embodiment, local schedule server 556 may communicate with various remote schedule servers 574 to determine the optimal remote site for rendering. Step 306 is also represented by arrow 404 in FIG. 11 and is described in more detail with reference to FIGS. 13 and 14.

At step 308, remote schedule server 574 places the job and support files on remote NFS disk 578, using a security layer to protect unauthorized duplication, destruction, and corruption of the files, as depicted by reference numeral 406 in FIG. 11. Step 308 is described in further detail with reference to FIG. 15. At step 310, the files are rendered in substantially the same manner as the local rendering method described with reference to FIGS. 1 through 10, as represented by arrows 408 in FIG. 11.

At step 312, as rendered files complete or log files are updated, results are sent back to NFS disk 558 at local site 500 in conjunction with periodic status notifications to client 504 or alternatively aperiodically, as depicted by arrow 404 on FIG. 11. In one embodiment, when remote site 502 completes the processing of the job, the job and all of its support files are repackaged in the compressed form described above and sent back to NFS disk 558 on local site 500. In another embodiment, the data submitted for the job can also be retained on remote NFS disk 578, or another network storage facility, to enable reuse/re-rendering of the entire job or a subset of its components. Billing information may also be captured at this time and stored as a status report. Billing factors may include processing time, CPU usage, size of the rendered or submitted jobs, or other appropriate metrics. All render files returned to client 504 may be encrypted possibly using a method requested by client 504 or other suitable method.

Figure 13:
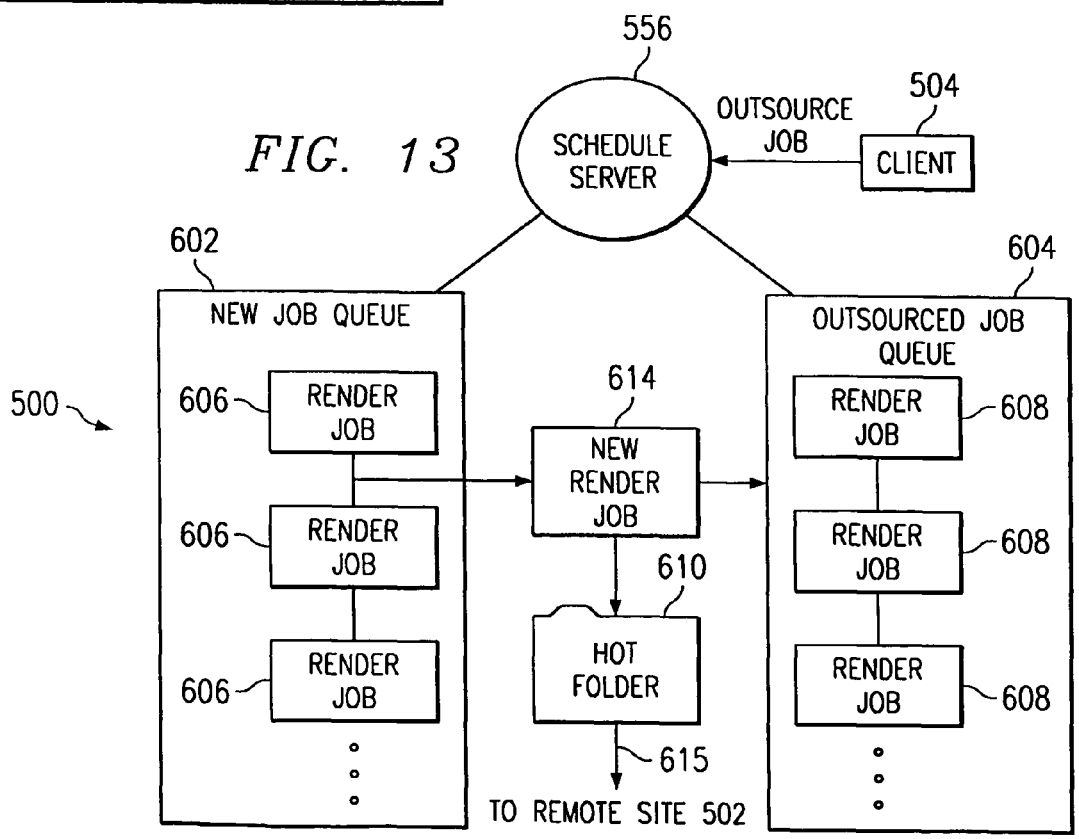
FIG. 13 is a block diagram of portions of a local site of FIG. 11 that facilitate description of a portion of the method of FIG. 12 in which a schedule server of FIG. 11 outsources a rendering job and support files to a remote site of FIG. 11.

FIG. 13 is a block diagram of portions of local site 500 that facilitate description of step 306 of schedule server 556 outsourcing a render job and support files to remote 502. A new job queue 602 is illustrated in FIG. 13 as being maintained by schedule server 556. New job queue 602 may be stored within schedule server 556, on other parts of an associated schedule host, or in other suitable locations to monitor incoming new jobs 606 received from one or more clients 504 (FIG. 11). Additionally, schedule server 556 may maintain at least one outsourced job queue 604 to monitor and process outsourced jobs 608. Outsourced job queue may be located and stored in a similar fashion to new job queue, described above. The arrangement of render jobs 606 and 608 within queues 602 and 604, respectively, may be according to priority based at least in part on information submitted by client 504.

In one embodiment, when job description 506 specifies that new render job 614 is to be rendered remotely, new render job 614 is pulled from new job queue 602 and inserted into outsourced job queue 604. Once new render job 614 is placed in outsourced job queue 604, a copy of new render job 614 is placed in a hot folder 610. Hot folder 610 is a directory on local site 500. Files placed in hot folder 610 are automatically copied to an associated hot folder 616 at remote site 502. According to one embodiment, files are copied using the File Transfer Protocol (FTP) and are transferred automatically, without operator intervention; however, other transfer methods may be used.) As stated in reference to step 306 in FIG. 12, included with new job 614 in hot folder 610 are copies of all necessary and requested support files, which are then be placed in hot folder 610. Hot folder 610 copies render job 614 and associated files to remote rendering site 502 via network 530, as depicted by reference number 615.

Figure 14:
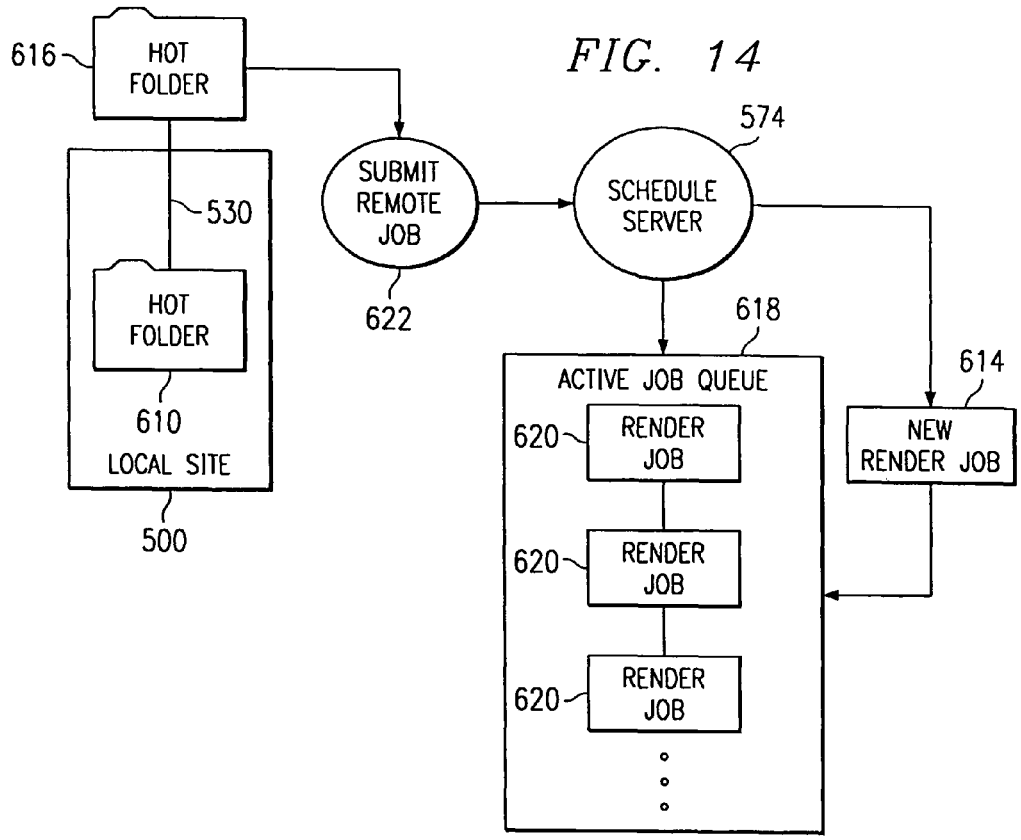
FIG. 14 is a block diagram of portions of a remote site of FIG. 11 that facilitate description of a portion of the method of FIG. 12 in which the remote site receives a processes and outsourced job.

FIG. 14 is a block diagram of portions of remote site 502 that facilitate description of remote site 502 receiving an outsourced rendering job from hot folder 610 on local site 500 and processing that outsourced render job by remote site 502. As shown in FIG. 14, a hot folder 610 on local site 500 is coupled to a hot folder 616 on the remote site 502 via previously described network connection 530. Remote schedule server 574 may maintain at least one active job queue 618 to manage and process multiple render jobs 620 concurrently. Active job queue 618 may be stored on a schedule best associated with schedule server 574 or other suitable locations.

New render job 614, previously located in hot folder 610 on local site 500, arrives at remote site 502 through hot folder 616 on remote site 502. In a particular embodiment, dropping render job 614 in hot folder 610 causes it to appear automatically in hot folder 616. Conversely, dropping render job 614 in hot folder 616 causes it to automatically appear in hot folder 610. The arrival of render job 614 in hot folder 616 automatically invokes a program "submit_remote_job" 622, which is responsible for submitting render job 614 to remote schedule server 574. "Submit_remote_job" 622 may be executed by a schedule host associated with schedule server 574, or by another suitable computer on remote site 502. "Submit_remote_job" program 622 also unpacks render job 614 and its support files from the compressed format in which they were delivered. Job description 506 is delivered to schedule server 574 and the remaining files are placed on remote NFS disk 578 employing the security measure described below with reference to FIG. 15. Before accepting new job 614, schedule server 574 reviews the job description and confirms with resource server 576 that remote site 502 has the capabilities to complete job 614.

Processing of render job 614 within schedule server 574 is substantially similar to the processing of a local rendering job described previously with reference to FIGS. 5A and 5B. First, a render job is created based on job description 506, and the resulting new render job 614. Job 614 is then placed in remote site's 502 active job queue 618 based on certain criteria. Generally, placement in the queue is based on the priority submitted by client 504 in job description 506; however, any other factor desired may also be relevant to placement in the queue. In this particular embodiment, new render job 614 is never placed in a new job queue on remote site 502. Once new render job 614 is placed in active job queue 618, it is essentially processed as any other local job, such as those described in reference to FIGS. 1 through 7. There are two differences to be discussed below in reference to FIG. 15, however. First, remote job 614 is flagged for special handling upon completion of the job. Second, remote job 614 is flagged for the use of a special I/O wrapper within remote render servers 570 in remote site 502.

Figure 15:
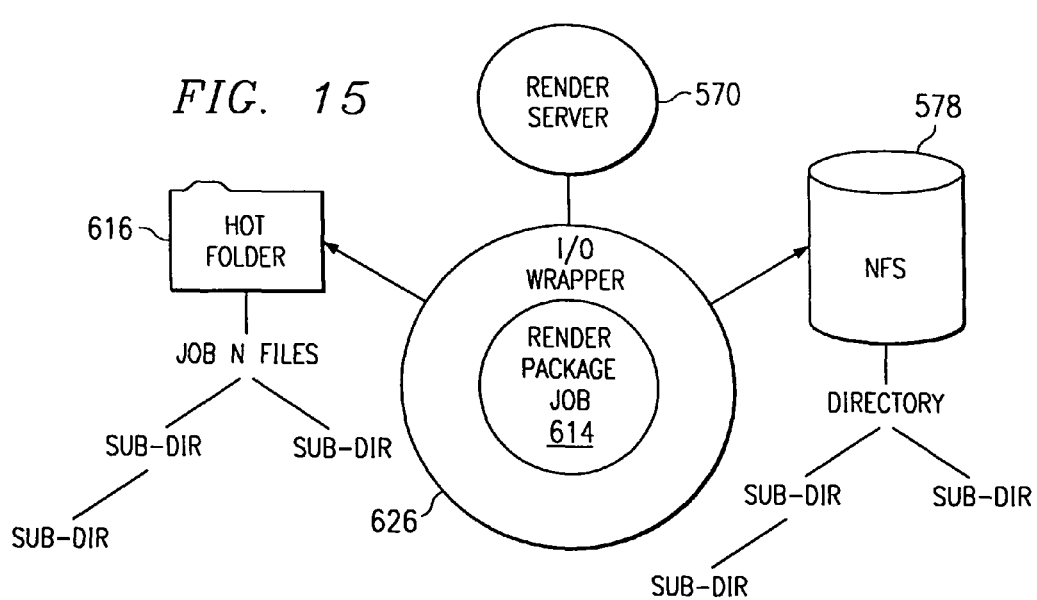
FIG. 15 is a block diagram illustrating operation of the remote site of FIG. 11 in restricting access to certain files by certain parties.

FIG. 15 is a block diagram illustrating the operation of remote site 502 in restricting access to certain files by certain parties. To do so, an I/O wrapper 626 is placed around remote render job 614. I/O wrapper 626 is a software library that overrides the standard operating system library used to access files. The activities performed by I/O wrapper 626 serve two purposes. First, I/O wrapper 626 allows the support files for job 614 to be easily moved between machines on both local site 500 and remote sites 502. References to relocated support files for job 614 can be resolved through I/O wrapper 626. Second, I/O wrapper 626 provides a level of security for users who send remote jobs, such as remote job 614, to remote render sites such as remote site 502. Sensitive texture files, plug-ins, client scripts, and images are kept beneath hot folder 616, and render jobs received through hot folders cannot see or access files in other hot folders. When remote site 502 processes jobs on behalf of multiple local sites 500 by using multiple hot folders, i.e. one for each local site, this prevents the jobs from accessing sensitive data accompanying jobs from another site. The security layer is implemented by permitting a customer to access only a limited area on remote NFS disk 578 when moving the support files to or from that location. This prevents one customer from accessing or corrupting a competing customer's support files that might also be located on remote NFS disk 578. Although the distributed rendering system may be utilized by any customer who desires rendering services, these two competing customers often include film studios. This security measure addresses a major potential concern of these customers when using a distributed rather than local rendering system. Example coding that may be used to implement I/O wrapper 626 is provided below in TABLE 1.

In one embodiment, the security measure operates by unpacking render job 614 and its support files beneath hot folder 616. Further, I/O wrapper 626 is then placed around the render package of job 614 used to perform the rendering of individual render frames 508. I/O wrapper 626 intercepts all file system read and write operations. Additionally, I/O wrapper 626 redirects file operations away from the remote render server 570 disks to files within hot folder 616. I/O wrapper 626 causes the render package from job 614 to find that job's support files, such as texture maps and plug-ins, in job 614's hot folder 616 rather than on remote NFS disk 578 or disks located on render servers 570. Rendered images for job 614 are also placed in hot folder 616 rather than on NFS disk 578 as a result of I/O wrapper 626. In one embodiment, the re-direction performed by I/O wrapper 626 is done transparently to render servers 570 and any off-the-shelf render packages, such as RenderMan or Maya, with which render servers 570 interfaces.

Figure 16:
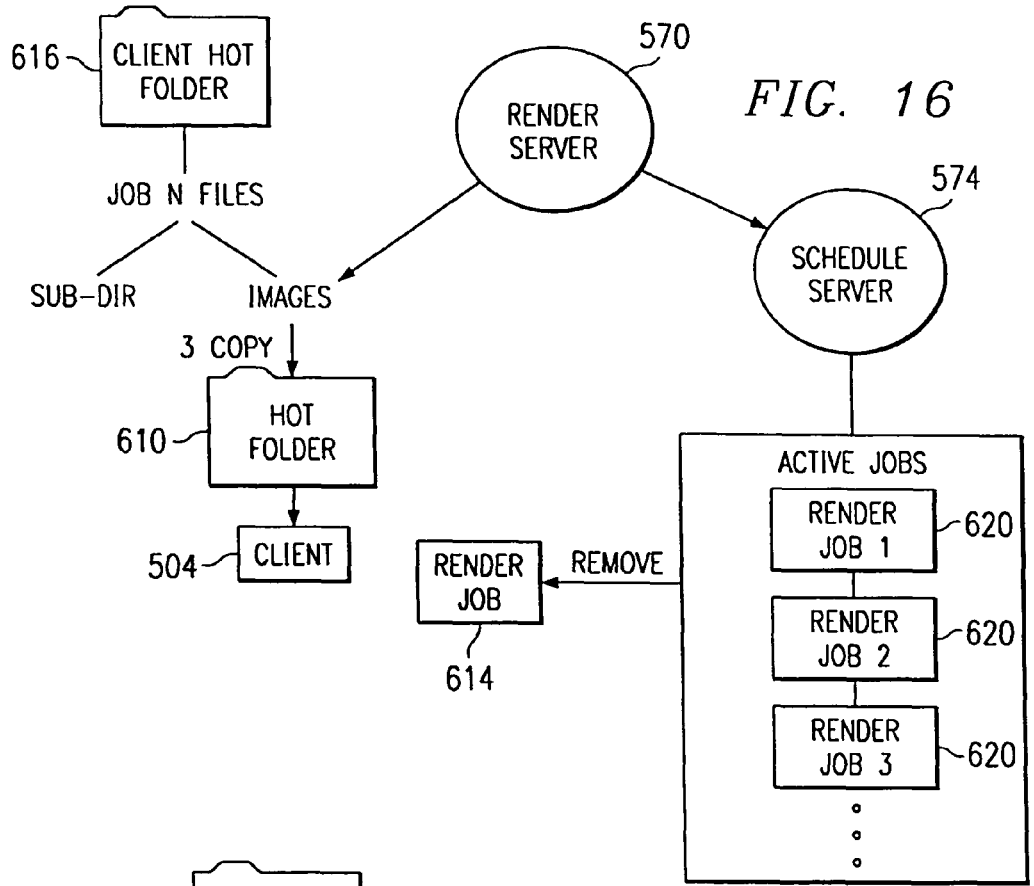
FIG. 16 is a block diagram illustrating the operation of remote site 502 in returning a completed job and its output to the local site of FIG. 11.

FIG. 16 is a block diagram illustrating the operation of remote site 502 in returning completed job 614 and its output to local site 500. As previously described with reference to FIG. 15, rendered images are placed beneath hot folder 616. This may be done automatically by I/O wrapper 626 applied to render servers 570. As render servers 570 complete the rendering of individual images for job 614, schedule server 574 is notified in a manner substantially similar to that described with reference to local rendering in FIGS. 6A and 6B. When all frames 508 within render job 614 have completed, job 614 is removed from active job queue 618 in substantially the same manner as described with reference to local rendering in FIGS. 6A and 6B. As the render job 614 completes, all rendered images are copied from their output location to hot folder 616. Hot folder 616 automatically returns the images to hot folder 610 at local site 500, the site that submitted job 614. This may be done transparently to any software, such as RenderMan or Maya within render servers 570. Also included with this return package for job 614 may be billing information and log files containing any information which may be relevant to a particular client 504.

Figure 17:
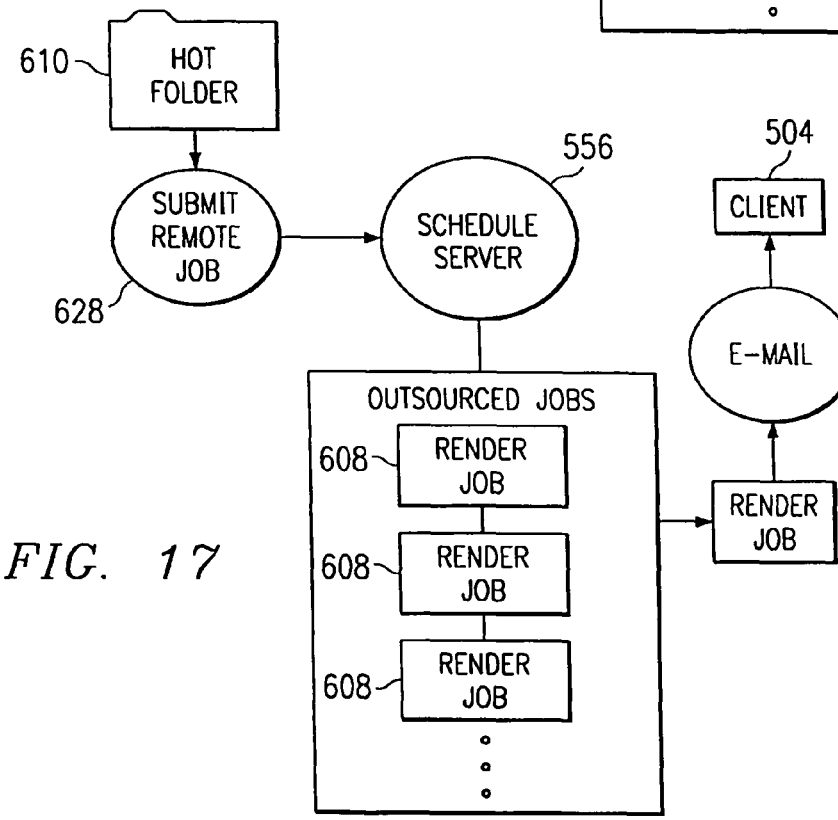
FIG. 17 is a block diagram illustrating processing of a returned job by the local site of FIG. 11 after rendering at the remote site of FIG. 11 is completed.

FIG. 17 is a block diagram illustrating processing of the returned job 614 by local site 500 after rendering at remote site 502 is completed. As described in conjunction with FIG. 18, hot folder 610 receives completed job 614 from hot folder 616. In one embodiment, by placing completed job 614 in hot folder 616 at remote site 502, completed job 614 automatically appears in hot folder 610 at local site 500. The program "submit_remote_job" 628 is invoked when completed job 614 appears in hot folder 610. Submit_remote_job 628 notifies local schedule server 574 that outsourced job 614 returned. Similar to the completion of a local job such as that described in reference to FIGS. 6A and 6B, schedule server 574 prompts the removal of job 614 from outsourced job queue 604. Client 504 is then notified in some manner of the completion of the job.

Although the present invention and its advantages have been described in detail, it should be understood that various changes, substitutions, and alterations can be made therein without departing from the spirit and scope of the invention as defined by the appended claims.

TABLE 1

Example Program Code for I/O Wrapper

```
#include <errno.h>
#include <stdio.h>
#include <stdlib.h>
#include <stdarg.h>
#include <unistd.h>
#include <sys/types.h>
#include <sys/stat.h>
#include <fcntl.h>
#include <dlfcn.h>
#include <limits.h>
#include "FieldLengths.H"
#include "Logicals.H"
/*
//////////////////////////////////////////////////
/
//
//      Globals used to remap open/fopen function
//      calls.
//
//////////////////////////////////////////////////
/
*/
static void *openRtn = 0;        /* Standard open( ) routine    */
static void *fopenRtn = 0;       /* Standard fopen( ) routine   */
static void *creatRtn = 0;       /* Standard creat( ) routine   */
static void *accessRtn = 0;      /* Standard access( ) routine  */
static void *statRtn = 0;        /* Standard stat( ) routine    */
static void *lstatRtn = 0;       /* Standard lstat( ) routine   */
static void *linkRtn = 0;        /* Standard link( ) routine    */
static void *unlinkRtn = 0;      /* Standard unlink( ) routine  */
static void *renameRtn = 0;      /* Standard rename( ) routine  */
static int initFlag = FALSE;     /* Library initialized flag    */
static char baseDirectory[MAX_SITEID_LEN + 1];
                                 /* Base of remote files        */
/*
//////////////////////////////////////////////////
/
//
//      InitializeLibrary( ) - Initialize internals of
//                             override library.
//
//////////////////////////////////////////////////
/
*/
```

TABLE 1-continued

Example Program Code for I/O Wrapper

```
static int InitializeLibrary( )
{
    void *libc;                    /* Handle to libc library    */
    char *baseDir;                 /* Base directory for files  */
*/
//      Get a handle to the standard libc shared
//      object library.
*/
    if (initFlag) return 0;        /* Already initialized       */
#ifdef BUILDN32
    if ((libc = dlopen("/usr/lib32/libc.so", RTLD_LAZY)) == 0) {
#endif
#ifdef BUILDO32
    if ((libc = dlopen("/usr/lib/libc.so", RTLD_LAZY)) == 0) {
#endif
#ifdef BUILD64
    if ((libc = dlopen("/usr/lib64/libc.so", RTLD_LAZY)) == 0) {
#endif
        errno = ENOENT;            /* Set global error          */
        return −1;                 /* And quit                  */
    }
/*
//      Save the pointers to the real libc functions.
*/
    if (((openRtn = dlsym(libc, "open")) == 0) || /* Can't find them?
                                                                 */
        ((fopenRtn = dlsym(libc, "fopen")) == 0) ||
        ((creatRtn = dlsym(libc, "creat")) == 0) ||
        ((accessRtn = dlsym(libc, "access")) == 0) ||
        ((statRtn = dlsym(libc, "stat")) == 0 ||
        ((lstatRtn = dlsym(libc, "lstat")) == 0) ||
        ((linkRtn = dlsym(libc, "link")) == 0) ||
        ((unlinkRtn = dlsym(libc, "unlink")) == 0) ||
        ((renameRtn = dlsym(libc, "rename")) == 0)) {
        dlclose(libc);             /* Kill the file             */
        errno = ENOENT;            /* Set global error          */
        return −1;                 /* And quit                  */
    }
/*
//      Extract the site ID which will serve
//      as the base for all files.
*/
    memset((void *)baseDirectory, '\0', (MAX_SITEID_LEN+1));
    if ((baseDir = getenv("ROD_BASEDIR")) != 0)    /* Have
environment?
        */
    strncpy(baseDirectory, baseDir, MAX_SITEID_LEN);
    initFlag = TRUE;               /* Don't need to repeat      */
    return 0;                      /* Success                   */
}
/*
////////////////////////////////////////////////////////////
/
//
//      CreateMappedFilename( ) - Map a filename to a specified
//                                base directory.
//
////////////////////////////////////////////////////////////
/
*/
int CreateMappedFilename(const char *filename, char *mappedName, int
limit)
{
    int bytesRequired;             /* Bytes in mapped name      */
    char currentDirectory[_POSIX_PATH_MAX+1];
/*
//      Clean-up the filenames before we begin.
*/
    if (filename == 0) {           /* No filename given?        */
        errno = EINVAL;            /* Invalid argument          */
        return −1;                 /* And quit                  */
    }
    while (isspace(*filename)) filename++;  /* Strip leading spaces */
/*
//      If we have an absolute filename just prefix
//      it with the base directory.
*/
    if (*filename =='/') {         /* Absolute path?            */
        bytesRequired = strlen(baseDirectory) + strlen(filename) + 1;
        if (bytesRequired > limit) {  /* Need too many?         */
            errno = ENAMETOOLONG;  /* Set global error          */
            return −1;             /* And quit                  */
        }
        memset((void *)mappedName, '\0', bytesRequired);
        strcpy(mappedName, baseDirectory);  /* Start with mapping
            */
        strcat(mappedName, filename);  /* Add original file      */
        return 0;                  /* It worked                 */
    }
/*
//      We have a relative filename. We need to
//      build the filename based upon the current
//      working directory.
*/
    memset((void *)currentDirectory, '\0', (_POSIX_PATH_MAX+1));
    if (getcwd(currentDirectory, (_POSIX_PATH_MAX+1)) == 0) return
−1;
    bytesRequired = strlen(baseDirectory) + strlen(currentDirectory)
                                          + strlen("/")
                                          + strlen(filename) + 1;
    if (bytesRequired > limit) {   /* Need too many?            */
        errno = ENAMETOOLONG;      /* Set global error          */
        return −1;                 /* And quit */
    }
    memset((void *)mappedName, '\0', bytesRequired);
    strcpy(mappedName, baseDirectory);   /* Start with mapping
        */
    strcat(mappedName, currentDirectory);  /* Add current
        */
    strcat(mappedName, "/");       /* Add                       */
                                   separator
    strcat(mappedName, filename);  /* Add original file
        */
    return 0;                      /* It worked                 */
}
/*
////////////////////////////////////////////////////////////
/
//
//      ValidateDirectory( ) - Validate the existence of
//                             a directory.
//
////////////////////////////////////////////////////////////
/
*/
int ValidateDirectory(char *pathName)
{
    char *ptr;                     /* Parsing pointer           */
    int (*accessPtr)(const char *, int);
/*
//      If the filename has no directory or the
//      directory is "/" it will exist.
*/
    if ((ptr = strrchr(pathName, '/')) == 0) return 0;
    if (ptr == pathName) return 0;  /* In "/"                   */
/*
//      Get the address of the real libc access
//      routine.
*/
    if (InitializeLibrary( ) != 0) return −1;  /* Setup library  */
    accessPtr = accessRtn;         /* Real access routine       */
/*
//      Strip of the filename and check if the
//      directory exists.
*/
    *ptr = '[0]';                  /* Remove directory          */
    if ((*accessPtr)(pathName, EX_OK) {  /* Look for base       */
    != 0)
        if ((errno == ENOENT) ||   /* Does not exist            */
            (errno == ENOTDIR)) {  /* Not existing?             */
            *ptr = '/';            /* Put back separator        */
            return −1;             /* And quit                  */
        }
    }
}
```

TABLE 1-continued

Example Program Code for I/O Wrapper

```
        *ptr = 'l';              /* Put back separator    */
        return 0;                /* And quit              */
}
/*
///////////////////////////////////////////////////////////
/
//
//      open( ) - Override of standard libc open call.
//
///////////////////////////////////////////////////////////
/
*/
int open(const char *path, int oflag, ...)
{
        int createMode;          /* File creation mode    */
        char mappedFile[_POSIX_PATH_   /* Name in base directory
            MAX+1];
            */
        va_list argPtr;          /* Variable argument list */
        int (*funcPtr)(const char *, int, ...);
        int (*accessPtr)(const char *, int);
/*
//      Validate the argmuments.
*/
        if (path == 0) {         /* Missing argument?     */
            errno = EINVAL;      /* Invalid argument      */
            return -1;           /* And quit              */
        }
/*fprintf(stderr, "WARNING Inside fopen %s %x\n", path, oflag);    */
/*
//      Get the address of the real libc open
//      routine.
*/
        if (InitializeLibrary( ) != 0) return -1;   /* Setup library */
        accessPtr = accessRtn;   /* Real access routine   */
        funcPtr = openRtn;       /* Real open routine     */
/*
//      Build the remapped filename for the open call.
*/
        if (CreateMappedFilename(path,
                    mappedFile,
                    _POSIX_PATH_MAX) != 0) return -1;
/*
//      If we are creating a file check if the mapped
//      directory exists. If it does create the file there.
*/
        if (oflag & O_CREAT) {   /* Creating a file?      */
            va_start(argPtr, oflag);   /* Point to extra args */
            createMode = va_arg(argPtr, int);   /* Get extra argument */
            va_end(argPtr);      /* End option parsing    */
            if (ValidateDirectory(mapped-   /* Directory exists? */
                File) != 0)
                */
                return (*funcPtr)(path, oflag, createMode);
            return (*funcPtr)(mappedFile, oflag, createMode);
        }
/*
//      If the filename does not exist under the mapped
//      directory open it where the user requested originally.
*/
        if ((*accessPtr) (mappedFile, EX_   /* Look for relocated
            OK) != 0) {
            */
            if ((errno == ENOENT) ||   /* Does not exist */
                (errno == ENOTDIR))
                return (*funcPtr)(path, oflag);   /* Open original file */
            */
        }
/*
//      Open the mapped file.
*/
        return (*funcPtr)(mappedFile, oflag);   /* Open mapped file */
            */
}
/*
///////////////////////////////////////////////////////////
/
//
//      creat( ) - Override of standard libc creat call.
//
///////////////////////////////////////////////////////////
/
*/
int creat(const char *path, mode_t mode)
{
        char mappedFile[_POSIX_PATH_   /* Name in base directory
            MAX+1];
            */
        int (*funcPtr)(const char *, mode_t);
/*
//      Validate the argmuments.
*/
        if (path == 0) {         /* Missing argument?     */
            errno = EINVAL;      /* Invalid argument      */
            return -1;           /* And quit              */
        }
/*fprintf(stderr, "WARNING Inside creat %s\n", path);    */
/*
//      Get the address of the real libc open
//      routine.
*/
        if (InitializeLibrary( ) != 0) return -1;   /* Setup library */
        funcPtr = creatRtn;      /* Real creat routine    */
/*
//      Build the remapped filename for the creat call.
*/
        if (CreateMappedFilename (path,
                    mappedFile,
                    _POSIX_PATH_MAX) != 0) return -1;
/*
//      Check if the mapped directory exists. If it
//      does create the file there.
*/
        if (ValidateDirectory(mapped-   /* Directory exists? */
            File) != 0)
            */
            return (*funcPtr)(path, mode);   /* Create original file */
        return (*funcPtr)(mappedFile, mode);   /* Create mapped file */
            */
}
/*
///////////////////////////////////////////////////////////
/
//
//      fopen( ) - Override of standard libc fopen call.
//
///////////////////////////////////////////////////////////
/
*/
FILE *fopen(const char *path, const char *mode)
{
        char mappedFile[_POSIX_   /* Name in base directory
            PATH_MAX+1];
            */
        FILE *(*funcPtr)(const char *, const char *);
        int (*accessPtr)(const char *, int);
/*
//      Validate the argmuments.
*/
        if ((path == 0) || (mode == 0)) {   /* Missing argument? */
            errno = EINVAL;      /* Invalid argument      */
            return 0;            /* And quit              */
        }
/*fprintf(stderr, "WARNING Inside fopen %s %s\n", path, mode);    */
/*
//      Get the address of the real libc fopen
//      routine.
*/
        if (InitializeLibrary( ) != 0) return 0;   /* Setup library */
        accessPtr = accessRtn;   /* Real access routine   */
        funcPtr = fopenRtn;      /* Real fopen routine    */
/*
//      Build the remapped filename for the open call.
```

TABLE 1-continued

Example Program Code for I/O Wrapper

```
        */
        if (CreateMappedFilename(path,
                        mappedFile,
                        __POSIX_PATH_MAX) != 0) return 0;
/*
//      If we are creating/writing a file check
//      if the mapped directory exists. If it
//      does create the file there.
*/
        if (strchr(mode, 'w') != 0) {          /* Writing a file?       */
                if (ValidateDirectory(mappedFile) != 0)/* Directory exists?
                */
                        return (*funcPtr)(path, mode);    /* Open original file
                        */
                return (*funcPtr)(mappedFile,    /* Open in mapped area   */
                mode);
        }
/*
//      If the filename does not exist under
//      the mapped directory open it where
//      the user requested originally.
*/
        if ((*accessPtr)(mappedFile, EX_       /* Look for relocated
        OK) != 0) {
                */
                if ((errno == ENOENT) ||        /* Does not exist         */
                        (errno == ENOTDIR)) {
                        return (*funcPtr)(path, mode);   /* Open original file
                        */
                }
        }
/*
//      Open the mapped file.
*/
        return (*funcptr)(mappedFile, mode);   /* Open mapped file      */
                */
}
/*
/////////////////////////////////////////////////////////////
/
//
//      access( ) - Override of standard libc access call.
//
/////////////////////////////////////////////////////////////
/
*/
int access(const char *path, int amode)
{
        char mappedFile[__POSIX_PATH_ /* Name in base directory
        MAX+1];
                */
        int (*funcPtr)(const char *, int);
/*
//      Validate the argmuments.
*/
        if (path == 0) {                        /* Missing argument?     */
                errno = EINVAL;                 /* Invalid argument      */
                return -1;                      /* And quit              */
        }
/*fprintf(stderr, "WARNING Inside access: %s\n", path);  */
/*
//      Get the address of the real libc fopen
//      routine.
*/
        if (InitializeLibrary( ) != 0) return -1;   /* Setup library      */
        funcPtr = accessRtn;                    /* Real access routine   */
/*
//      If the filename does not exist under
//      the mapped directory look for it where
//      the user requested originally.
*/
        if (CreateMappedFilename(path, mappedFile, __POSIX_PATH_MAX)
        != 0)
return -1;
        if ((*funcPtr)(mappedFile, amode) != 0) { /* Open mapped file      */
                */
                if ((errno == ENOENT) ||       /* Does not exist        */
                        (errno == ENOTDIR)) {
                        return (*funcPtr)(path, amode);  /* Open original file
                        */
                }
                return -1;                      /* Quit with error       */
        }
        return 0;                               /* Access               */
                                                worked
}
/*
/////////////////////////////////////////////////////////////
/
//
//      stat( ) - Override of standard libc stat call.
//
/////////////////////////////////////////////////////////////
/
*/
int stat(const char *path, struct stat *buf)
{
        char mappedFile[__POSIX_PATH_ /* Name in base directory
        MAX+1];
                */
        int (*funcPtr)(const char *, struct stat *);
        int (*accessPtr)(const char *, int);
/*
//      Validate the argmuments.
*/
        if (path == 0) {                        /* Missing argument?     */
                errno = EINVAL;                 /* Invalid argument      */
                return -1;                      /* And quit              */
        }
/*fprintf(stderr, "WARNING Inside stat: %s\n", path);      */
/*
//      Get the address of the real libc stat
//      routine.
*/
        if (InitializeLibrary( ) != 0) return -1;  /* Setup library      */
        accessPtr = accessRtn;                  /* Real access
        routine */
        funcPtr = statRtn;                      /* Real stat routine     */
/*
//      If the filename does not exist under
//      the mapped directory look for it where
//      the user requested originally.
*/
        if (CreateMappedFilename(path, mappedFile, __POSIX_PATH_MAX)
        != 0)
return -1;
        if ((*accessPtr)(mappedFile, EX_OK) != /* Look for relocated
        0) {
                */
                if ((errno == ENOENT) ||       /* Does not exist */
                        (errno == ENOTDIR)) {
                        return (*funcPtr)(path, buf);    /* stat original file
                        */
                }
        }
        return (*funcPtr)(mappedFile, buf);    /* stat mapped file      */
                */
}
/*
/////////////////////////////////////////////////////////////
/
//
//      lstat( ) - Override of standard libc lstat call.
//
/////////////////////////////////////////////////////////////
/
*/
int lstat(const char *path, struct stat *buf)
{
        char mappedFile[__POSIX_PATH_ /* Name in base directory
        MAX+1];
                */
        int (*funcPtr)(const char *, struct stat *);
        int (*accessPtr)(const char *, int);
```

TABLE 1-continued

Example Program Code for I/O Wrapper

```
/*
//      Validate the argmuments.
*/
        if (path == 0) {                    /* Missing argument?   */
            errno = EINVAL;                 /* Invalid argument    */
            return −1;                      /* And quit            */
        }
/*fprintf(stderr, "WARNING Inside lstat: %s\n", path);            */
/*
//      Get the address of the real libc lstat
//      routine.
*/
        if (InitializeLibrary( ) != 0) return −1;   /* Setup library   */
        accessPtr = accessRtn;                      /* Real access     */
routine */
        funcPtr = lstatRtn;                 /* Real lstat routine  */
/*
//      If the filename does not exist under
//      the mapped directory look for it where
//      the user requested originally.
*/
        if (CreateMappedFilename(path, mappedFile, __POSIX_PATH_MAX)
            != 0)
return −1;
        if ((*accessPtr)(mappedFile, EX_OK)   /* Look for relocated
            != 0) {
*/
            if ((errno == ENOENT) ||         /* Does not exist      */
                (errno == ENOTDIR)) {
                return (*funcPtr)(path, buf);    /* stat original file   */
            }
        }
        return (*funcPtr)(mappedFile, buf);  /* stat mapped file
            */
}
/*
//////////////////////////////////////////////////////////////////
/
//
//      link( ) - Override of standard libc link call.
//
//////////////////////////////////////////////////////////////////
/
*/
int link(const char *path1, const char *path2)
{
    char mappedFile1[__POSIX_       /* Name in base directory
        PATH_MAX+1];
        */
    char mappedFile2[__POSIX_PATH_MAX+1];
    int (*funcPtr)(const char *, const char *);
    int (*accessPtr)(const char *, int);
/*
//      Validate the argmuments.
*/
        if ((path1 == 0) || (path2 == 0)) {    /* Missing argument?
            */
            errno = EINVAL;                  /* Invalid argument    */
            return −1;                       /* And quit            */
        }
/*fprintf(stderr, "WARNING Inside link: %s %s\n", path1, path2);*/
/*
//      Get the address of the real libc link
//      routine.
*/
        if (InitializeLibrary( ) != 0) return −1;   /* Setup library   */
        accessPtr = accessRtn;                      /* Real access     */
routine */
        funcPtr = linkRtn;                  /* Real link routine  */
/*
//      If the filename does not exist under
//      the mapped directory look for it where
//      the user requested originally.
*/
        if (CreateMappedFilename(path1, mappedFile1, __POSIX_PATH_
            MAX) != 0)
return −1;
```

TABLE 1-continued

Example Program Code for I/O Wrapper

```
        if ((*accessPtr)(mappedFile1, EX_OK)   /* Look for relocated
            != 0) {
*/
            if ((errno == ENOENT) ||         /* Does not exist      */
                (errno == ENOTDIR)) {
                return (*funcPtr)(path1, path2);   /* link original file */
                */
            }
        }
        if (CreateMappedFilename(path2, mappedFile2, __POSIX_PATH_
            MAX) != 0)
return −1;
        return (*funcPtr)(mappedFile1,         /* link mapped file
            mappedFile2);
            */
}
/*
//////////////////////////////////////////////////////////////////
/
//
//      unlink( ) - Override of standard libc unlink call.
//
//////////////////////////////////////////////////////////////////
/
*/
int unlink
(const
char
*path)
{
    char mappedFile[__POSIX_PATH_    /* Name in base directory
        MAX+1];
        */
    int (*funcPtr)(const char *);
    int (*accessPtr)(const char *, int);
/*
//      Validate the argmuments.
*/
        if (path == 0) {                    /* Missing argument?   */
            errno = EINVAL;                 /* Invalid argument    */
            return −1;                      /* And quit            */
        }
/*fprintf(stderr, "WARNING Inside unlink: %s\n", path);           */
/*
//      Get the address of the real libc unlink
//      routine.
*/
        if (InitializeLibrary( ) != 0) return −1;   /* Setup library   */
        accessPtr = accessRtn;                      /* Real access     */
routine */
        funcPtr = unlinkRtn;                /* Real unlink routine */
/*
//      If the filename does not exist under
//      the mapped directory look for it where
//      the user requested originally.
*/
        if (CreateMappedFilename(path, mappedFile, __POSIX_PATH_MAX)
            != 0)
return −1;
        if ((*accessPtr)(mappedFile, EX_OK)   /* Look for relocated
            != 0) {
*/
            if ((errno == ENOENT) ||         /* Does not exist */
                (errno == ENOTDIR)) {
                return (*funcPtr)(path);     /* unlink original
file */
            }
        }
        return (*funcPtr)(mappedFile);       /* unlink mapped file   */
}
/*
//////////////////////////////////////////////////////////////////
/
//
//      rename( ) - Override of standard libc rename call.
//
//////////////////////////////////////////////////////////////////
```

TABLE 1-continued

Example Program Code for I/O Wrapper

```
/
*/
int rename
(const
char
*path1,
const
char
*path2)
{
    char mappedFile1[_POSIX_       /* Name in base directory
    PATH_                          */
    MAX+];
    char mappedFile2[_POSIX_PATH_MAX+1];
    int (*funcPtr)(const char *, const char *);
    int (*accessPtr)(const char *, int);
/*
//      Validate the argmuments.
*/
    if ((path1 == 0) || (path2 == 0)) {    /* Missing argument?
                                           */
        errno = EINVAL;              /* Invalid argument    */
        return −1;                   /* And quit            */
    }
/*fprintf(stderr, "WARNING Inside rename: %s %s\n", path1, path2);*/
/*
//      Get the address of the real libc rename
//      routine.
*/
    if (InitializeLibrary( ) != 0) return −1;    /* Setup library   */
    accessPtr = accessRtn;                       /* Real access
routine */
    funcPtr = renameRtn;                         /* Real rename routine */
/*
//      If the filename does not exist under
//      the mapped directory look for it where
//      the user requested originally.
*/
    if (CreateMappedFilename(path1, mappedFile1, _POSIX_PATH_
    MAX) != 0)
return −1;
    if ((*accessPtr)(mappedFile1,               /* Look for relocated
    EX_OK) != 0) {
*/
        if ((errno == ENOENT) ||             /* Does not exist         */
            (errno == ENOTDIR)) {
            return (*funcPtr)(path1, path2);  /* link original file
            */
        }
    }
    if (CreateMappedFilename(path2, mappedFile2, _POSIX_
    PATH_MAX) != 0)
return −1;
    return (*funcPtr)(mappedFile1,             /* link mapped file
    mappedFile2);
    */
}
```

What is claimed is:

1. A computerized method for rendering images, comprising:
   receiving from a client a render job having an associated job profile and a plurality of frames in an animation sequence;
   determining whether the render job is to be handled at a site local to the client or at a site remote from the client, the determination being based on an indication provided by the render job or processing availability at the site local to the client;
   distributing via a communications medium a first frame of the animation sequence to a first one of a plurality of render servers and a second frame of the animation sequence to a second one of the plurality of render servers based at least in part on the job profile, the first and second frames being different;
   rendering the first and second frames concurrently at the first and second render servers;
   forwarding the rendered first and second frames to a network storage system for retrieval by the client;
   providing one or more samples of the rendered first or second frames for the render job to the client prior to completion of rendering the first or second frame by the first and second servers;
   receiving an input from the client in response to the one or more samples, the input requesting that the render job is to be canceled prior to completion of rendering the first or second frame by the first and second servers.

2. The method of claim 1, wherein receiving from a client the render job comprises receiving the render job from a computer remote from the plurality of render servers.

3. The method of claim 1, wherein distributing the first and second frames comprises distributing the first and second frames by a scheduler, the scheduler operable to determine which of the plurality of render servers are capable of rendering the first and second frames.

4. The method of claim 3, wherein the scheduler is operable to determine which of the plurality of render servers are capable of rendering the first and second frames by accessing a database storing the capabilities of each of the plurality of render servers.

5. The method of claim 4, wherein the capabilities database stores the type of rendering package associated with each of the plurality of render servers.

6. The method of claim 4, wherein the capabilities database stores a processing status for each of the plurality of the render servers.

7. The method of claim 1, and further comprising transmitting the rendered first and second frames to the client.

8. A system for rendering images, comprising:
   a resource database comprising resource information regarding a plurality of render servers; and
   a schedule server coupled to the plurality of render servers via a communications medium, the schedule server operable to receive a render job from a client, the render job having an associated job profile and a plurality of image frames in a sequence, the scheduler operable to determine whether the render job is to be handled at a site local to the client or at a site remote from the client, the determination being based on an indication provided by the render job or processing availability at the site local to the client, the schedule server operable to distribute a first frame of the sequence to a first one of a plurality of render servers based on a comparison of the job profile and the resource information, the schedule server operable to provide one or more samples of the rendered first frame received from the first one of the plurality of render servers for the render job to the client prior to completion of rendering the first frame by the first one of the plurality of render servers, the schedule server operable to receive an input from the client in response to the one or more samples, the input requesting that the render job is to be canceled prior to completion of rendering the first or second frame by the first and second servers.

9. The system of claim 8, wherein the resource information comprises the type of rendering package associated with each of the plurality of render servers.

10. The system of claim 8, wherein the resource information comprises a processing status for each of the plurality of render servers.

11. The system of claim 8, wherein the schedule server is operable to determine whether a particular one of the render servers is capable of rendering a particular render job.

12. The system of claim 8, wherein the resource database further comprises resource information regarding a plurality of render hosts associated with respective ones of the render servers.

13. The system of claim 12, wherein the resource information comprises hardware configuration information regarding the render hosts.

14. A system for providing distributed rendering servers comprising:
 a local rendering system operable to receive from a client a render job having a plurality of frames in an animation sequence, the local rendering system operable to determine whether the render job is to be handled at the local rendering system, the determination being based on an indication provided by the render job or processing availability at the local rendering system; and
 at least one remote rendering system comprising a plurality of remote render servers and operable to:
  receive from the local rendering system the render job in response to the local rendering system determining that the render job is to be handled remotely;
  distribute a first frame of the sequence to a first one of the plurality of remote render servers and a second frame of the sequence to a second one of the plurality of remote render servers, the first and second frames being different;
  render the first and second frames concurrently at the first and second remote render servers; and
  return a result of the render job to the local rendering system;
  wherein the remote rendering system is operable to provide one or more samples of the rendered first or second frames for the render job to the local rendering system prior to completion of rendering of the first or second frame by the remote rendering system, wherein the remote rendering system is operable to receive an input from the client in response to the one or more samples, the input requesting that the render job is to be canceled prior to completion of rendering the first or second frame by the first and second servers.

15. The system of claim 14, wherein the local rendering system comprises:
 a plurality of render servers operable to render a render job having an associated job profile;
 a resource database comprising resource information regarding the plurality of render servers; and
 a schedule server coupled to the render server via a communications medium and operable to distribute the render job to one or more of a plurality of render servers based on a comparison of the job profile and the resource information.

16. The system of claim 14, wherein the remote rendering system comprises:
 a resource database comprising resource information regarding the plurality of render servers; and
 a schedule server coupled to the remote render servers via a communications medium and operable to distribute the render job to at least the first and second remote render servers based on a comparison of the job profile and the resource information.

17. The system of claim 16, wherein the resource information comprises the type of rendering package associated with each of the plurality of remote render servers.

18. The system of claim 16, wherein the resource information comprises a processing status for each of the plurality of remote render servers.

19. The system of claim 16, wherein the schedule server is operable to determine whether a particular one of the remote render servers is capable of rendering a particular render job.

20. The system of claim 16, wherein the resource database further comprises resource information regarding a plurality of render hosts associated with respective ones of the remote render servers.

21. A computerized method for rendering images comprising:
 receiving a render job having a plurality of frames in an animation sequence from a client at a first rendering site;
 determining whether the render job is to be handled at the first rendering site, the determination being based on an indication provided by the render job or processing availability at the first rendering site;
 transferring the render job from the first rendering site to a second rendering site in response to the first rendering site determining that the render job is to be handled remotely, the second rendering site located remote from the first rendering site and comprising a plurality of remote render servers;
 distributing a first frame of the sequence to a first one of the plurality of remote render servers and a second frame of the sequence to a second one of the plurality of remote render servers, wherein the first and second frames are different;
 rendering the first and second frames concurrently at the first and second remote render servers;
 providing one or more samples of the rendered first or second frames for the render job to the client prior to completion of rendering of the first or second frames by the first and second remote servers;
 receiving an input from the client in response to the one or more samples, the input requesting that the render job is to be canceled prior to completion of rendering the first or second frame by the first and second servers.

22. The method of claim 21, and further comprising transmitting the rendered first and second frames to the client.

23. The method of claim 21, and further comprising transmitting the rendered first and second frames from the second render site to the first render site.

24. The method of claim 21, and further comprising storing the rendered first and second frames in a location accessible by the client.

25. The method of claim 21, wherein the first rendering site comprises:
 a plurality of render servers operable to render a render job having an associated job profile;
 a resource database comprising resource information regarding the plurality of render servers; and
 a schedule server coupled to the render server via a communications medium and operable to distribute the render job to one or more of a plurality of render servers based on a comparison of the job profile and the resource information.

26. The method of claim 21, wherein the second rendering site comprises:
 a resource database comprising resource information regarding the plurality of render servers; and
 a schedule server coupled to the remote render servers via a communications medium and operable to distribute the render job to at least the first and second remote render servers based on a comparison of the job profile and the resource information.

27. The method of claim 21, and further comprising transferring files associated with the render job from the first site to the second site, the associated files being necessary to render the render job.

28. The method of claim 27, wherein the associated files comprise a texture file.

29. The method of claim 21, and further comprising notifying, by the second rendering site, the first rendering site when the render job has been rendered.

* * * * *